US010620682B2

(12) United States Patent
Gupta et al.

(10) Patent No.: US 10,620,682 B2
(45) Date of Patent: Apr. 14, 2020

(54) SYSTEM, APPARATUS AND METHOD FOR PROCESSOR-EXTERNAL OVERRIDE OF HARDWARE PERFORMANCE STATE CONTROL OF A PROCESSOR

(71) Applicant: Intel Corporation, Santa Clara, CA (US)

(72) Inventors: Nikhil Gupta, Portland, OR (US); Israel Hirsh, Kiryat Motzkin (IL); Esfir Natanzon, Haifa (IL); Nir Rosenzweig, Givat Ella (IL); Efraim Rotem, Haifa (IL); Guy M. Therien, Beaverton, OR (US); Ankush Varma, Hillsboro, OR (US); Eliezer Weissmann, Haifa (IL)

(73) Assignee: Intel Corporation, Santa Clara, CA (US)

( * ) Notice: Subject to any disclaimer, the term of this patent is extended or adjusted under 35 U.S.C. 154(b) by 141 days.

(21) Appl. No.: 15/849,995

(22) Filed: Dec. 21, 2017

(65) Prior Publication Data
US 2019/0196573 A1    Jun. 27, 2019

(51) Int. Cl.
*G06F 1/32* (2019.01)
*G06F 1/3206* (2019.01)
*G06F 1/3203* (2019.01)
*G06F 1/3293* (2019.01)

(52) U.S. Cl.
CPC .......... *G06F 1/3206* (2013.01); *G06F 1/3203* (2013.01); *G06F 1/3293* (2013.01)

(58) Field of Classification Search
CPC ..... G06F 1/3206; G06F 1/3203; G06F 1/3293
See application file for complete search history.

(56) References Cited

U.S. PATENT DOCUMENTS

| 5,163,153 A | 11/1992 | Cole et al. |
| 5,522,087 A | 5/1996 | Hsiang |
| 5,590,341 A | 12/1996 | Matter |

(Continued)

FOREIGN PATENT DOCUMENTS

EP     1 282 030 A1    5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Stefan Stoynov
(74) *Attorney, Agent, or Firm* — Trop, Pruner & Hu, P.C.

(57) ABSTRACT

In one embodiment, a processor includes: one or more cores to execute instructions; a first request register to store hardware performance state control information for a first core of the one or more cores obtained from an operating system; a second request register to store hardware performance state control override information, the hardware performance state control override information to be received from a management controller coupled to the processor; and a power controller coupled to the one or more cores to control a performance state of the first core based at least in part on the hardware performance state override information when at least one override indicator of the second request register is set. Other embodiments are described and claimed.

20 Claims, 22 Drawing Sheets

(56) References Cited

U.S. PATENT DOCUMENTS

| | | | |
|---|---|---|---|
| 5,621,250 A | 4/1997 | Kim | |
| 5,931,950 A | 8/1999 | Hsu | |
| 6,105,142 A * | 8/2000 | Goff | G06F 9/46 713/320 |
| 6,345,362 B1 * | 2/2002 | Bertin | G06F 1/3203 713/300 |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 9,223,384 B2 * | 12/2015 | Bridges | G06F 1/324 |
| 9,710,043 B2 | 7/2017 | Weissmann et al. | |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0250260 A1 | 10/2008 | Tomita | |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0115309 A1 | 5/2010 | Carvalho | |
| 2010/0146513 A1 | 6/2010 | Song | |
| 2010/0191997 A1 | 7/2010 | Dodeja et al. | |
| 2011/0154090 A1 | 6/2011 | Dixon et al. | |
| 2012/0079290 A1 | 3/2012 | Kumar | |
| 2012/0246506 A1 | 9/2012 | Knight | |
| 2013/0061064 A1 | 3/2013 | Ananthakrishnan et al. | |
| 2013/0080803 A1 | 3/2013 | Ananthakrishnan et al. | |
| 2013/0080804 A1 | 3/2013 | Ananthakrishnan et al. | |
| 2013/0111120 A1 | 5/2013 | Ananthakrishnan et al. | |
| 2013/0111121 A1 | 5/2013 | Ananthakrishnan et al. | |
| 2013/0111226 A1 | 5/2013 | Ananthakrishnan et al. | |
| 2013/0111236 A1 | 5/2013 | Ananthakrishnan et al. | |
| 2013/0346774 A1 | 12/2013 | Bhandaru et al. | |
| 2014/0068290 A1 | 3/2014 | Bhandaru et al. | |
| 2014/0195829 A1 | 7/2014 | Bhandaru et al. | |
| 2014/0208141 A1 | 7/2014 | Bhandaru et al. | |

OTHER PUBLICATIONS

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Microarchitecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 111-116.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Corporation, "Intel 64 and IA-32 Architectures Software Developer's Manual," vol. 3B: System Programming Guide, Sep. 2016, Chapter 14 Power and Thermal Management (14.1-14.9.5), 39 pages.

U.S. Appl. No. 15/190,377, filed Jun. 23, 2016, entitled "Controlling Forced Idle State Operation in a Processor," by Eliezer Weissmann, et al. (3524).

U.S. Appl. No. 15/252,511, filed Aug. 31, 2016, entitled "Controlling a Performance State of a Processor Using a Combination of Package and Thread Hint Information," by Eliezer Weissmann, et al. (3553).

* cited by examiner

SYSTEM, APPARATUS AND METHOD FOR PROCESSOR-EXTERNAL OVERRIDE OF HARDWARE PERFORMANCE STATE CONTROL OF A PROCESSOR

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Figure 1:
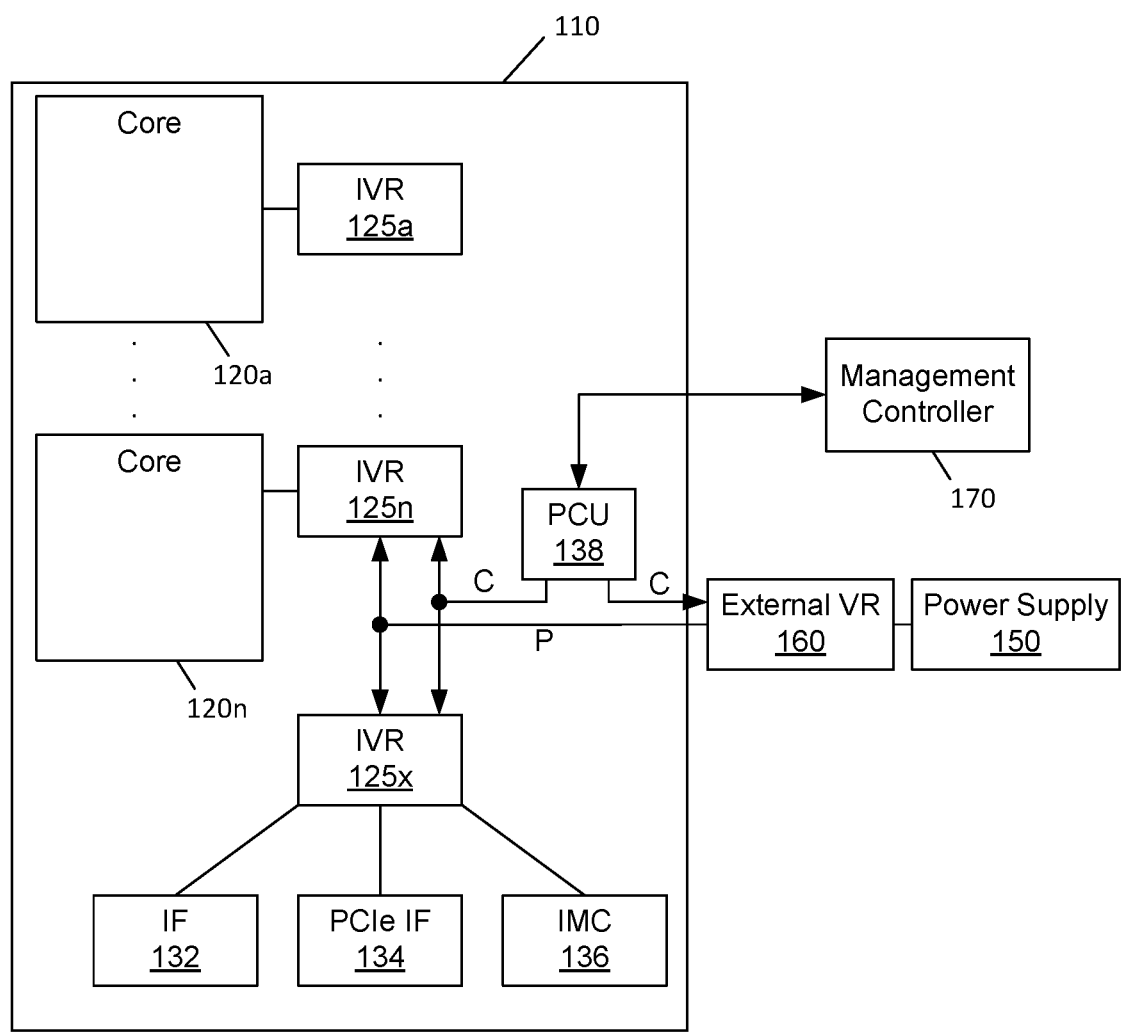
FIG. 1 is a block diagram of a portion of a system in accordance with an embodiment of the present invention.

In various embodiments, a processor can be power controlled autonomously using hardware of the processor. This autonomous power control enables greater allocation of power available to the processor in a manner that may increase performance. Still further, while this autonomous hardware power control can be based at least in part on configuration parameters provided by an operating system (OS), virtual machine monitor (VMM), or other system software, techniques described herein further enable this autonomous power control to occur further based at least in part on additional so-called override information provided from one or more processor-external entities.

More specifically, in embodiments a processor may include a power controller that can perform dynamic performance control of performance states of one or more cores or other processing circuits of the processor according to an OS-based mechanism such as an Advanced Configuration and Power Interface (ACPI) mechanism or other OS native support. Still further, this power controller can autonomously select performance states while utilizing OS and/or thread-supplied performance guidance hints, referred to as hardware-controlled performance states (HWP), also referred to as Intel® Speed Shift Technology. When HWP is active, processor hardware such as the power controller may autonomously select performance states as deemed appropriate for the applied workload and with consideration of constraining hints that are programmed by OS and/or executing threads as described herein. These hints include minimum and maximum performance limits, preference towards energy efficiency or performance, and the specification of a relevant workload history observation time window, as examples. In addition, using embodiments herein one or more of these OS/thread-provided hints can be overridden based on processor-external override information received in the processor from a processor-external entity such as a management controller.

In current models, HWP is controlled exclusively by a single source, either natively (by an OS), or externally to a processor (such as via a platform environment control interface (PECI)) in managed systems such as data center server systems. Note this PECI-based control only occurs when an out-of-band mode is enabled. Out-of-band mode operation is mutually exclusive to native mode, and may be selected by system firmware such as basic input/output system (BIOS) during boot. In this mode, PECI-based control can influence certain HWP control parameters in a manner to affect operation of an entire processor or other SoC.

In various embodiments, PECI-based control of one or more HWP parameters while in native HWP mode provides an option for an original equipment manufacturer (OEM), e.g., via OEM software, to override one or more OS HWP control parameters, while other OS HWP control parameters are left unaffected. In this way, a system operator (such as a data center manager) can influence frequency selection or other performance state configuration parameters to account for temporary rack/data center-level events that are not known to the OS. In client-based systems such as personal computers, similar PECI-based control can be used by a platform controller such as a power and thermal manager, which may be implemented as an on-board controller. In this way, a platform-based agent can, e.g., perform a minimum performance state override to raise performance, a maximum performance state override to reduce power, and/or perform an energy performance preference override to raise performance or reduce power.

Furthermore, embodiments enable individual field control of PECI-based override parameters that allows for flexibility to override one or more (a subset) but not all OS inputs. Embodiments may be implemented such that when present and active, the PECI-based configuration parameters override those of the OS, to realize an explicit override that gives priority to a data center operator. Embodiments provide this support option in a manner to allow the OS to operate and control performance states via the HWP interface even when part of its control parameters may be overridden by PECI-based override information.

Although the scope of the present invention is not limited in this regard, override information may relate to configuration parameters/hints that typically do not change instantaneously. In embodiments herein, these parameters/hints may include energy performance preference (EPP), and minimum and maximum performance states. In embodiments herein, override information provided via a PECI interface may be used to control HWP operation across an entire processor or other SoC, without providing an opportunity for an OS or other supervisor software/firmware to prevent such override when the technique is enabled.

In order to enable HWP control by PECI while concurrently in operation with HWP native OS support, status, interrupt or other information to identify such override may be provided to the OS. Such information may include identification of what type of OS control parameter was overridden and when it was overridden. Still further, the OS may be notified in runtime when the override is started and ended.

Note that the resolving of the source of HWP control parameters may be performed per physical thread (logical processor). In native OS support mode, the value is taken per field either from a thread level model specific register (MSR) or from a package level MSR. In PECI override mode, the value per one or more fields may be taken from a PECI override MSR, referred to herein as a PECI HWP request register. Note this override is performed for all of the physical threads, while OS-based settings are based on thread-level or package-level MSRs.

The OS can monitor in runtime this PECI HWP request register to identify which fields are (or are not) to be overridden and the value that was delivered by the PECI interface to override the OS native request setting. The OS can handle in runtime a notification that identifies when override is started and ended, e.g., via an interrupt indicator within an HWP interrupt register. In turn, the OS can enumerate the status of the PECI-based override mode using indicators within the HWP status register and fields currently overridden (and their values).

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel®. Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software). One power management logic unit included in PCU 138 may be a hardware performance state controller. Such hardware performance state controller may be implemented as a hardware circuit that can autonomously control performance states of one or more cores 120 or other logic units of processor 110. In some cases, the hardware performance state controller may autonomously perform performance state control based at least in part on hint information provided by an OS. Furthermore, as described herein at least some of this OS-provided hint information may be dynamically overridden based on information received from a management controller 170, which is a processor-external hardware component of system 100. Although the scope of the present invention is not limited in this regard, in embodiments management controller 170 may be implemented as a power management integrated circuit (PMIC), baseboard management controller or so forth. As will be described herein, PCU 138 may enable a partial override of OS-provided hints by way of this processor-external override information, referred to herein as PECI-based override information.

While not shown for ease of illustration, understand that additional components may be present within processor 110 such as additional control circuitry, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. Embodiments described herein may enable dynamic changes to the guaranteed frequency of the P1 performance state, based on a variety of inputs and processor operating parameters. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
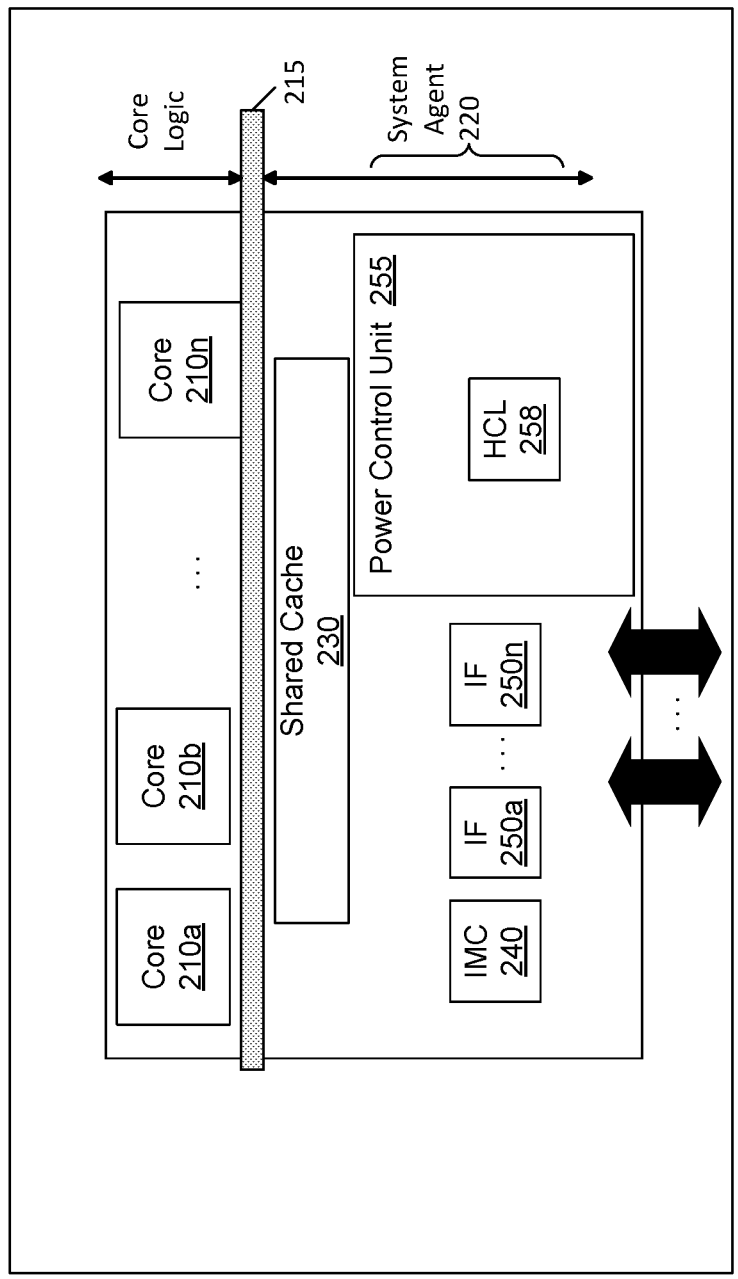
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via an interconnect 215 to a system agent 220 that includes various components. As seen, system agent 220 may include a shared cache 230 which may be a last level cache. In addition, the system agent may include an integrated memory controller 240 to communicate with a system memory (not shown in FIG. 2), e.g., via a memory bus. System agent 220 also includes various interfaces 250 and a power control unit 255, which may include logic to perform the power management techniques described herein. In the embodiment shown, power control unit 255 includes hardware performance state control logic (HCL) 258 that may perform autonomous performance state control within processor 200 based at least in part on OS-provided hints and/or PECI-based override hint information, as described herein.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
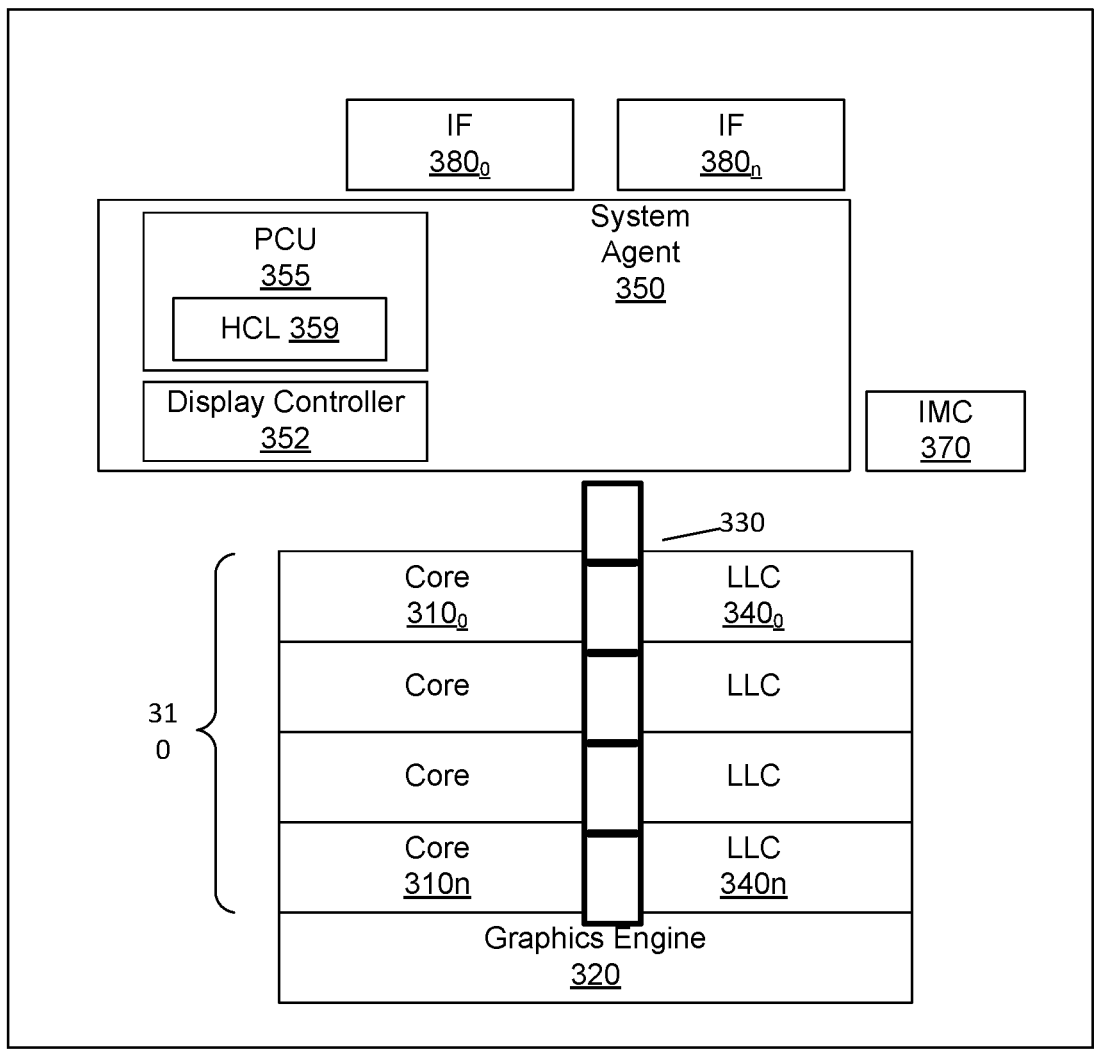
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein. In the embodiment shown, power control unit 355 includes a hardware performance state control logic 359 which may, inter alia, dynamically override OS-provided HWP hint information with PECI-based override parameters received from a processor-external entity.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
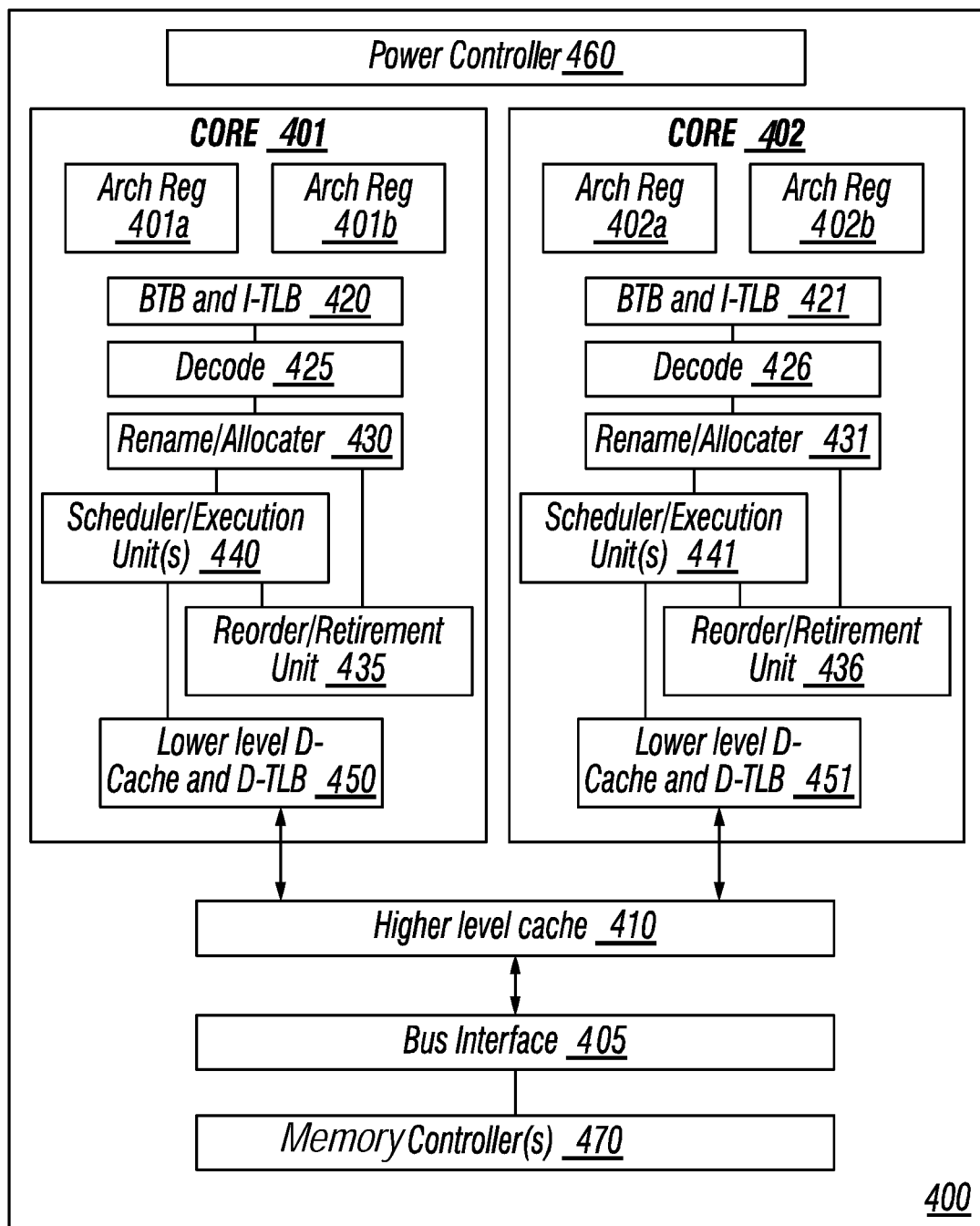
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core.

However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
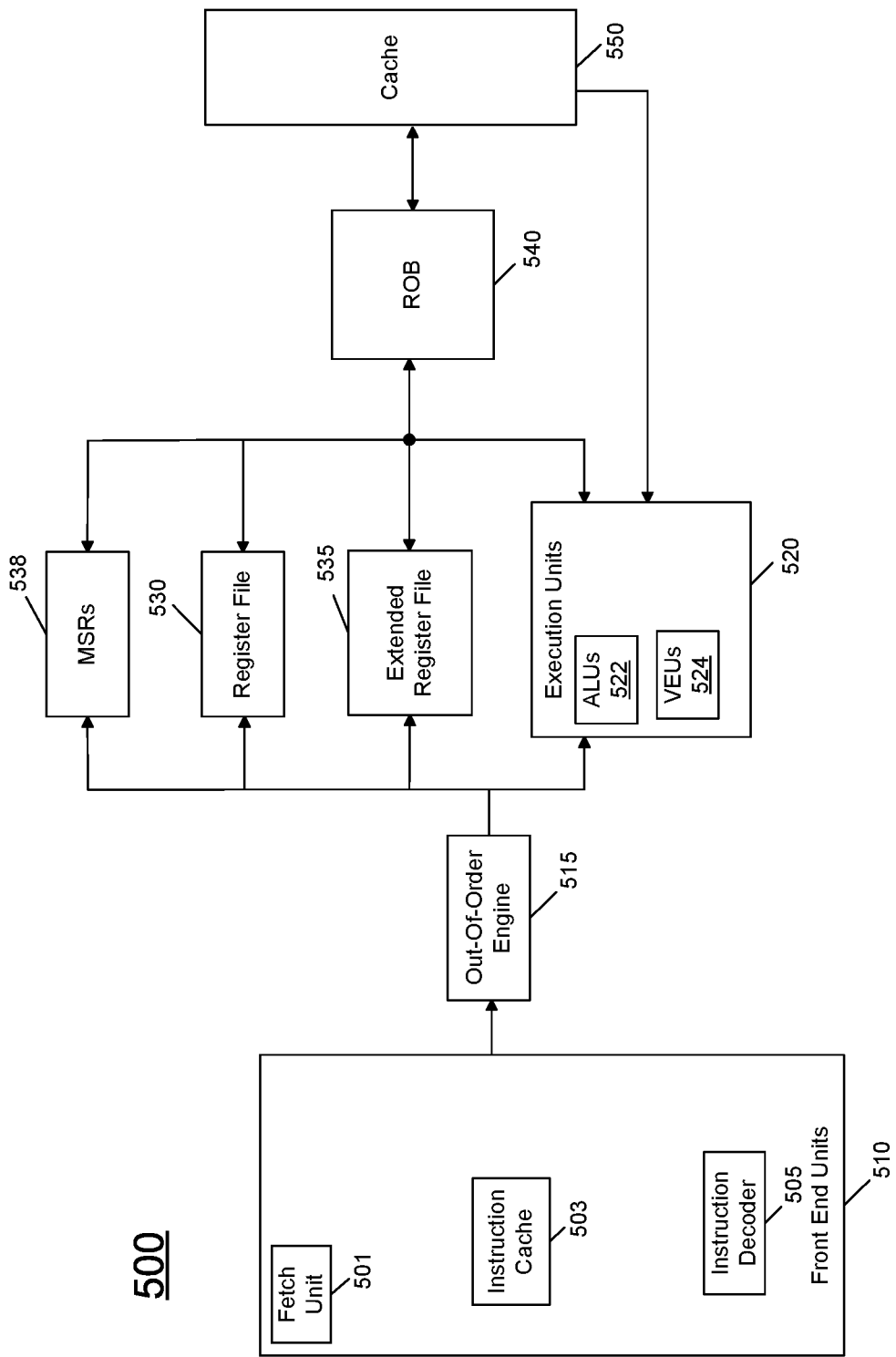
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register. For purposes of configuration, control, and additional operations, a set of machine specific registers (MSRs) 538 may also be present and accessible to various logic within core 500 (and external to the core) such as HWP MSRs (including a HWP PECI request register as described herein).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
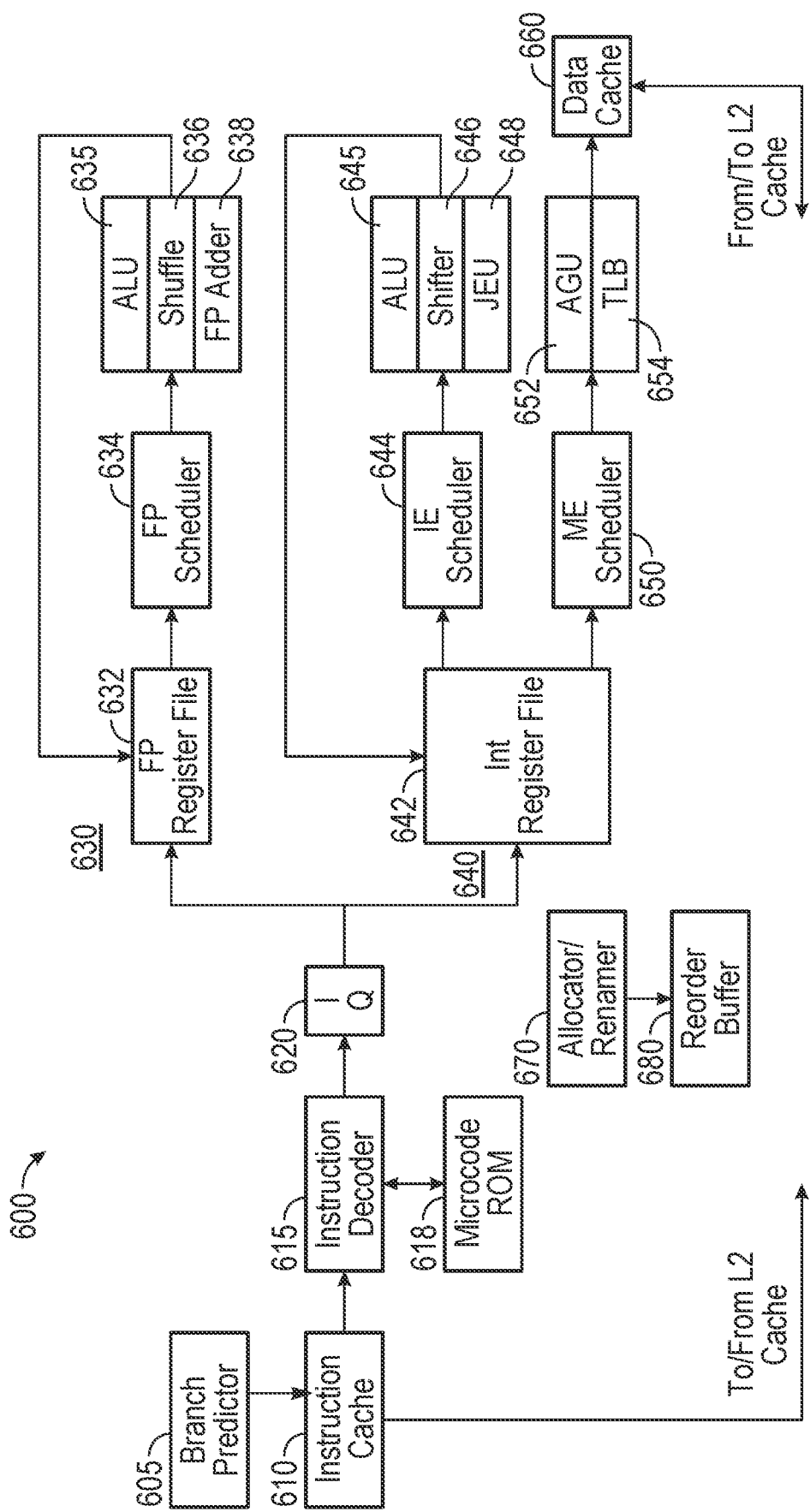
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel®. Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
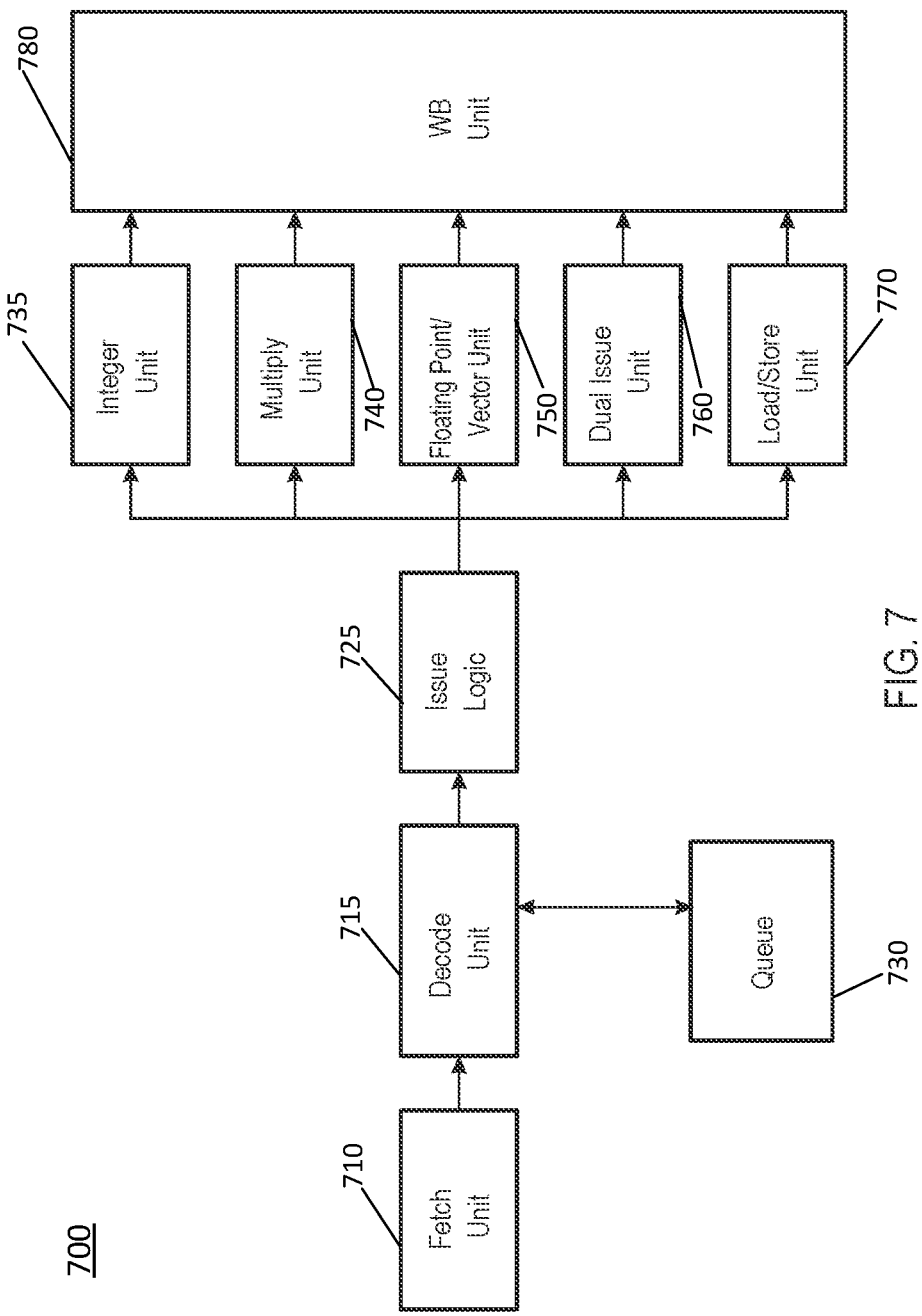
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
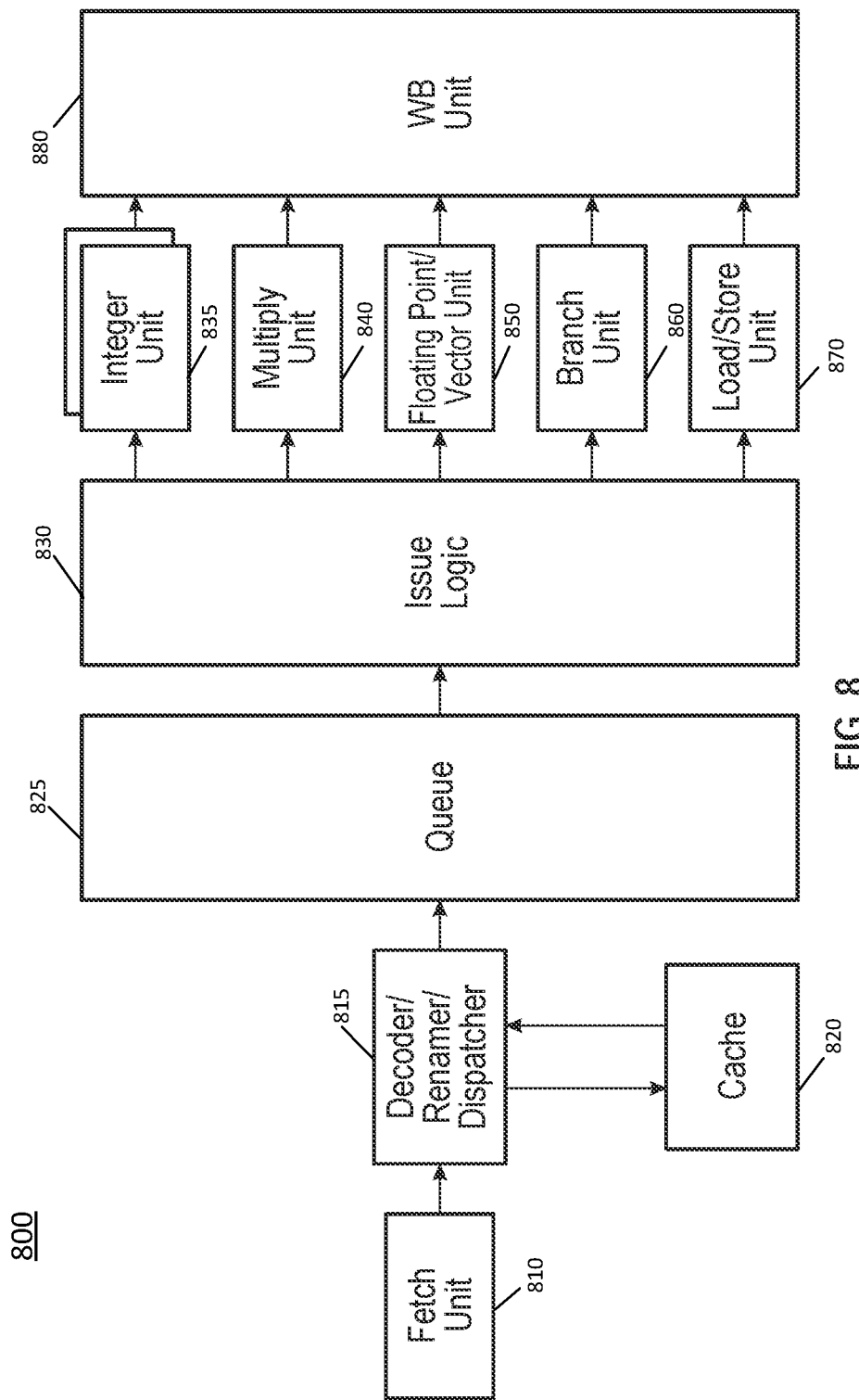
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
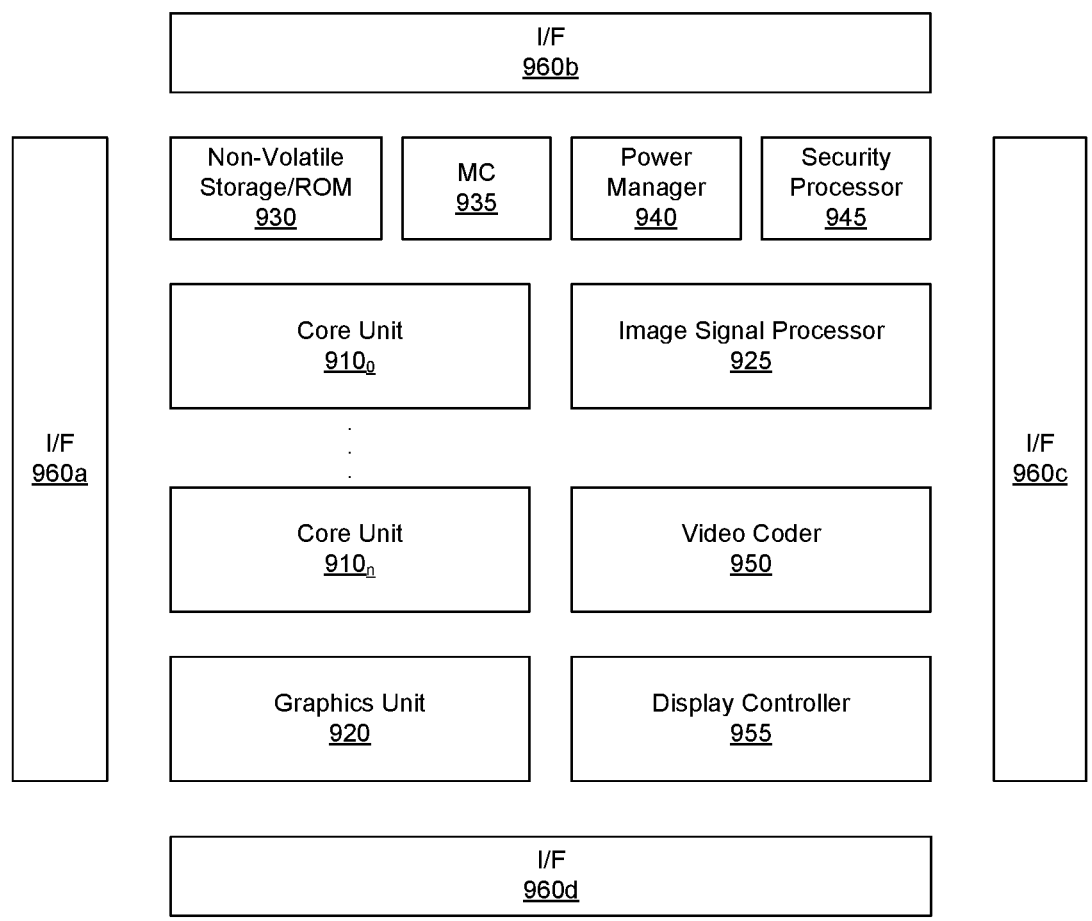
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
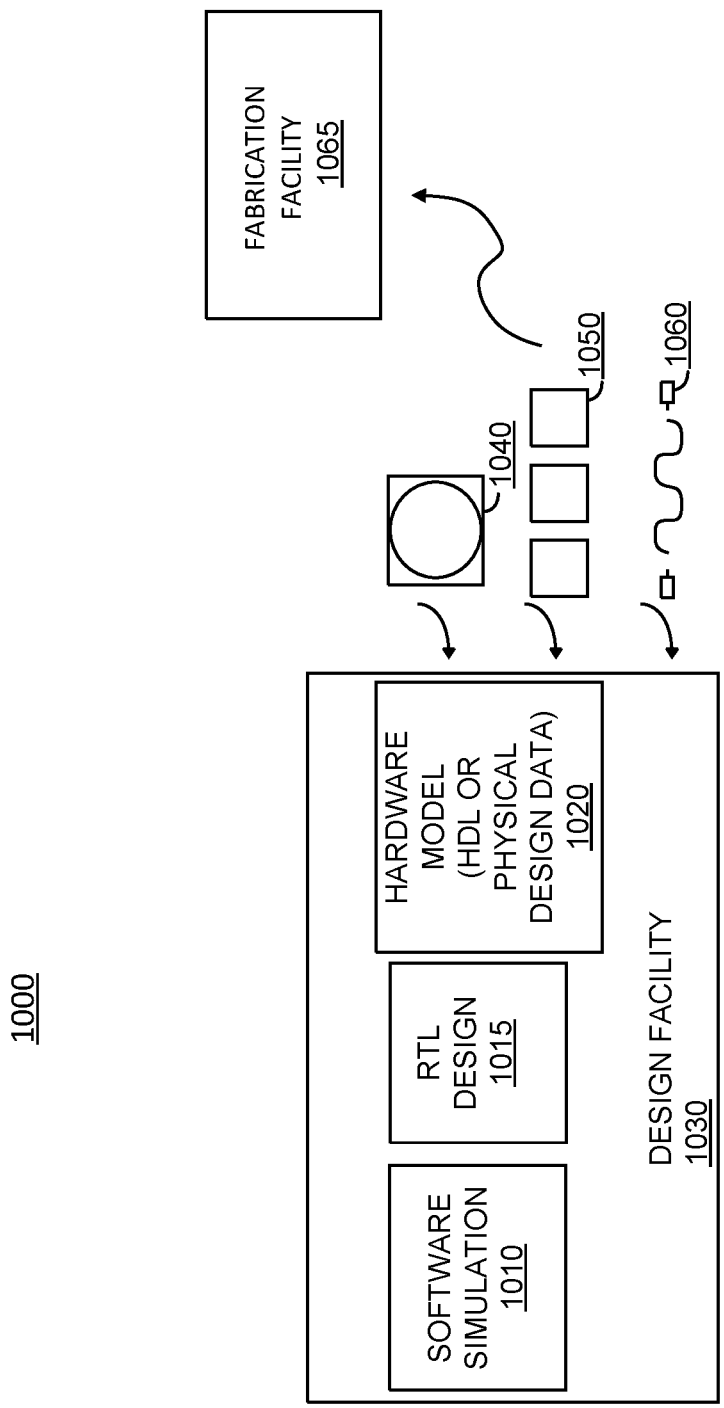
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel® and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
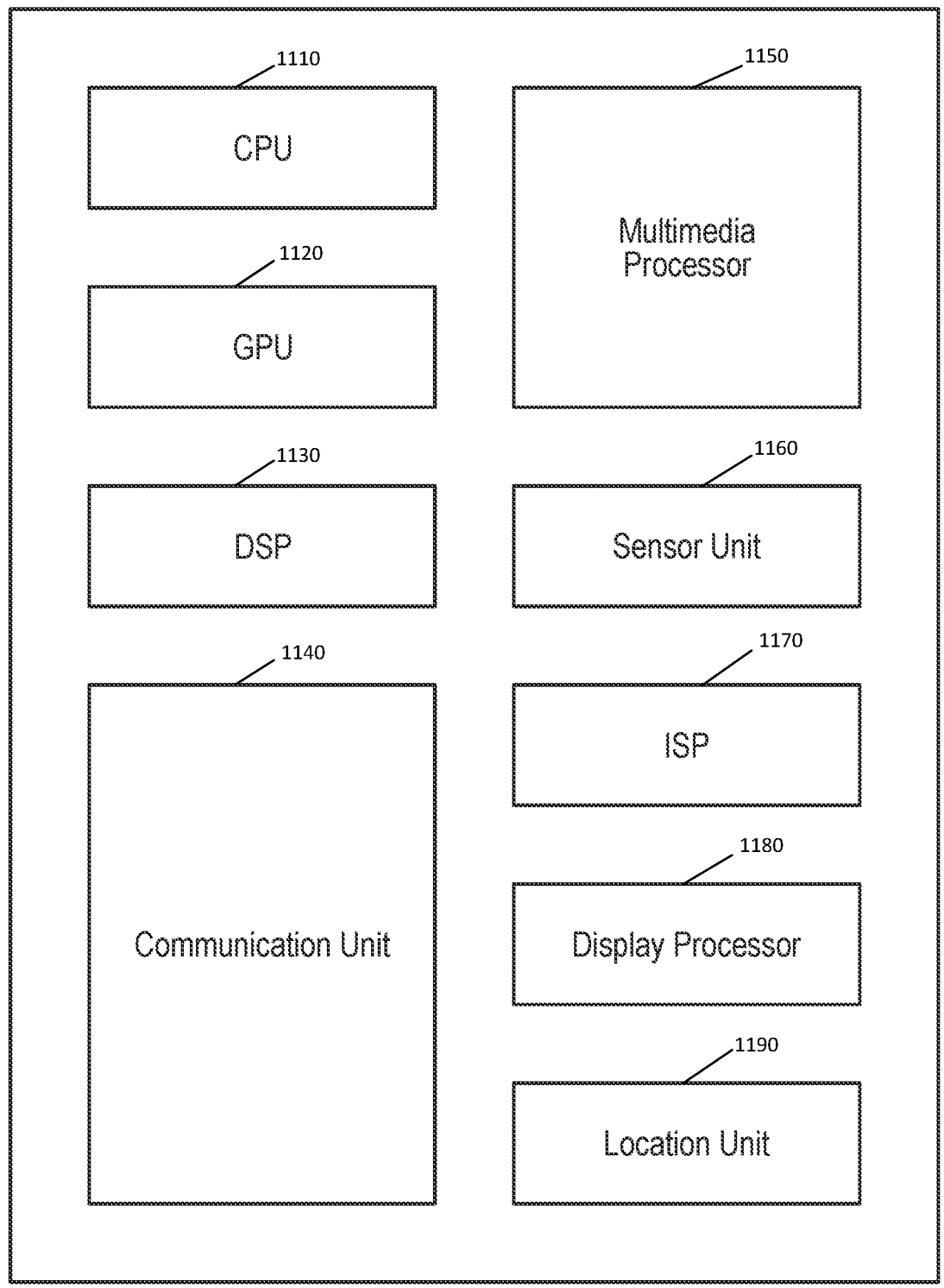
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
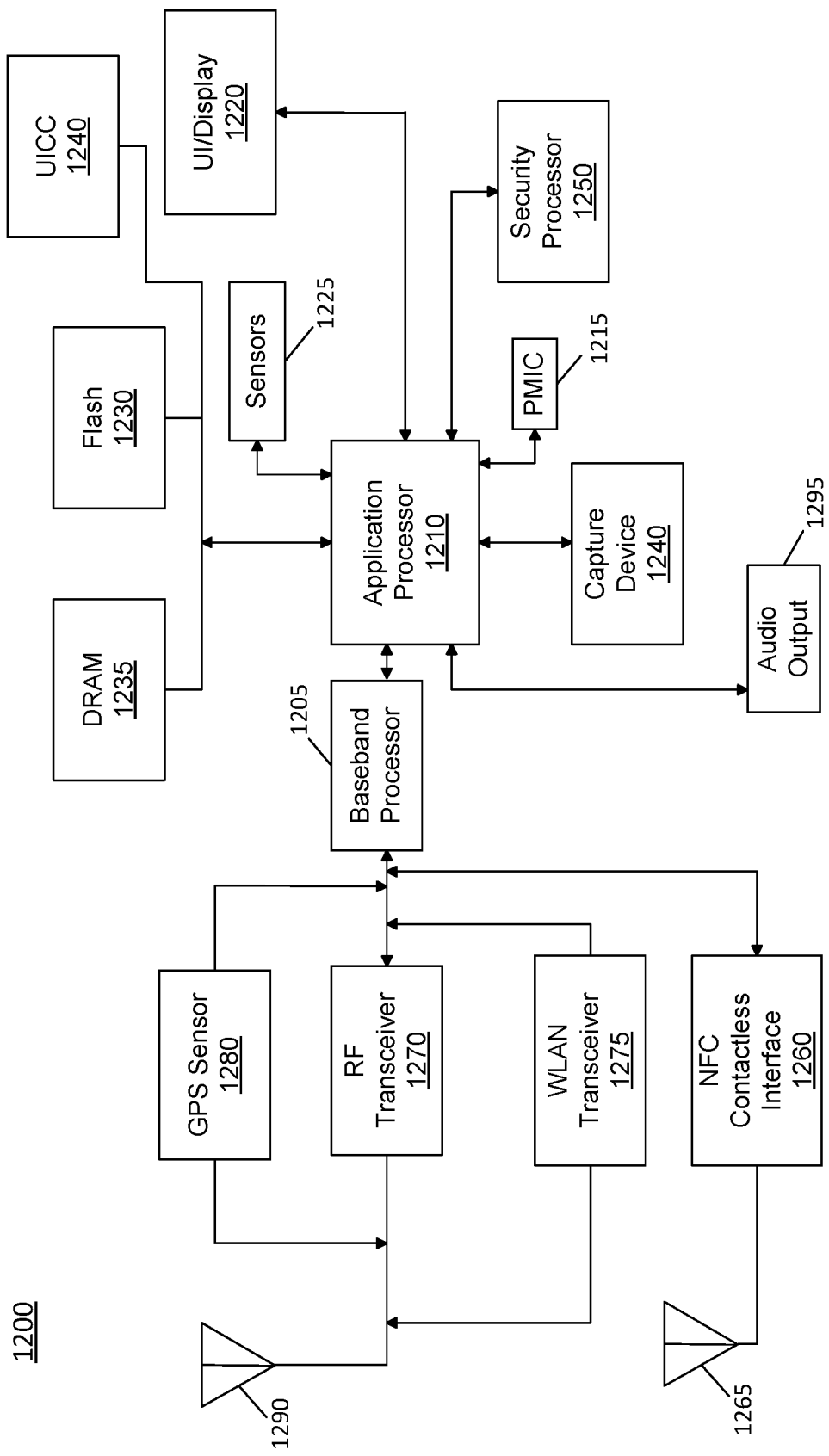
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A PMIC 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200. Still further, as described herein PMIC 1215 may provide override information for one or more HWP parameters, which may be sent via a PECI interface that couples between PMIC 1215 and application processor 1210.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
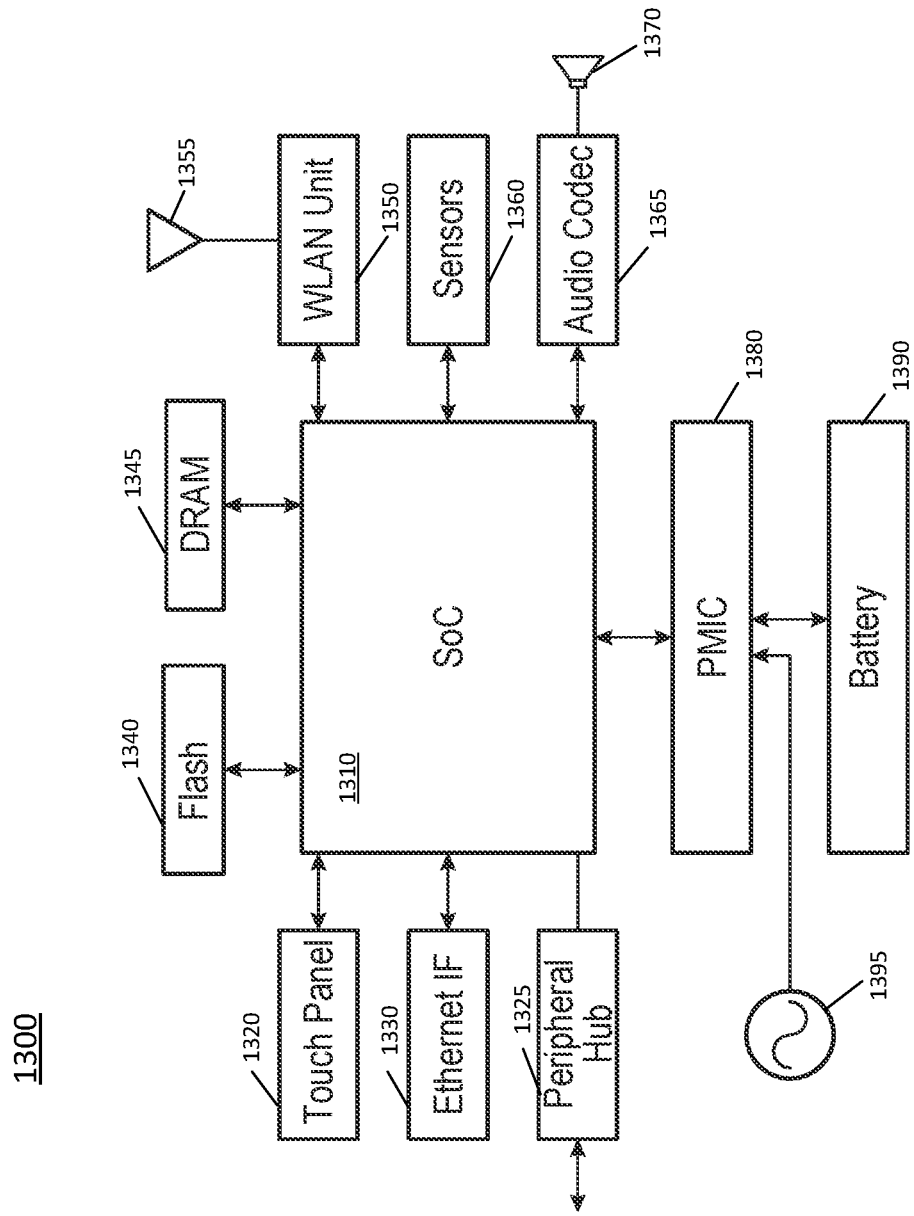
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310. Still further, as described herein PMIC 1380 may provide override information for one or more HWP parameters, which may be sent via a PECI interface that couples between PMIC 1380 and SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
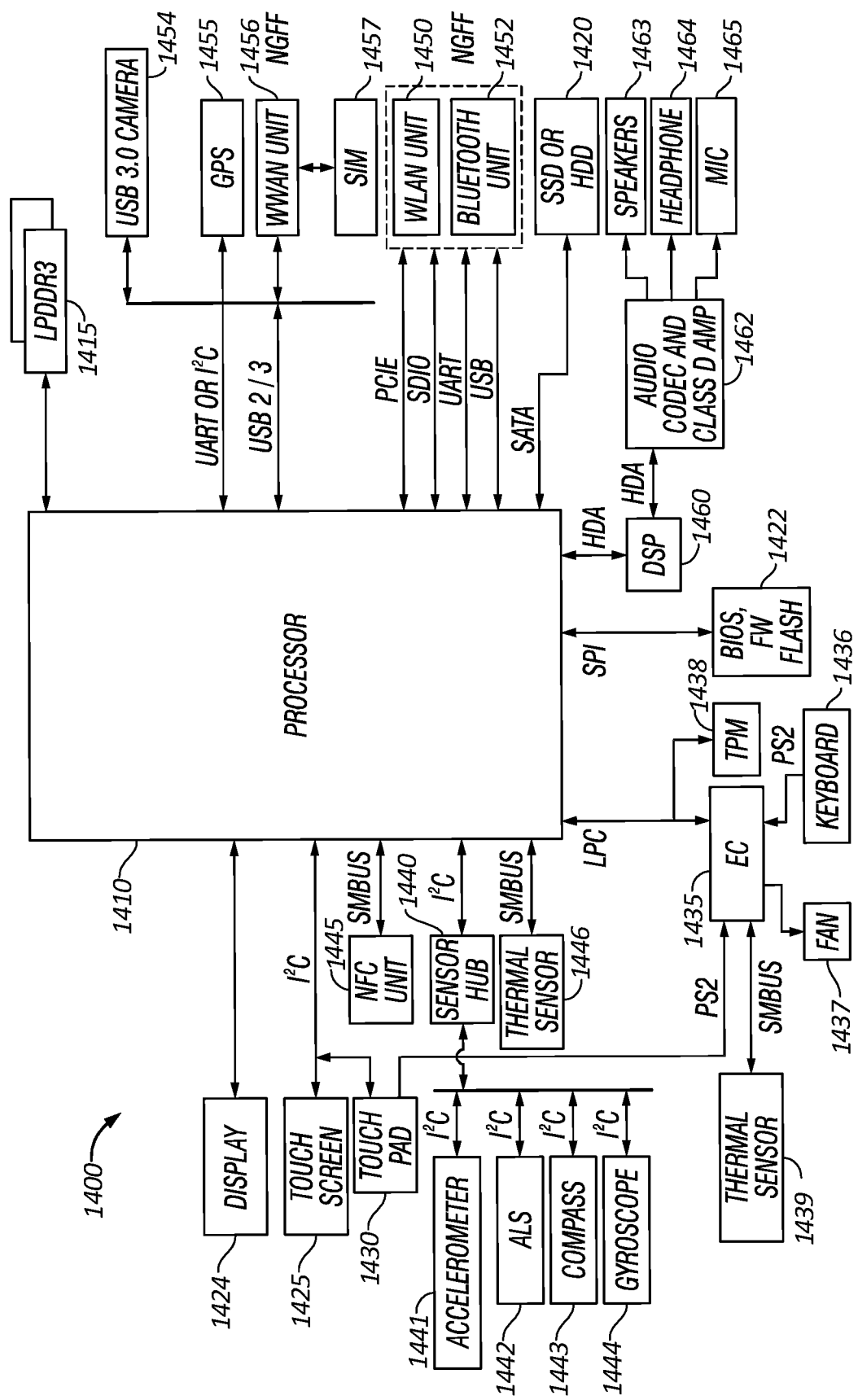
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I.sup.2C interconnect. As further shown in FIG. 14, in addition to touch screen 1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an $I_{2C}$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
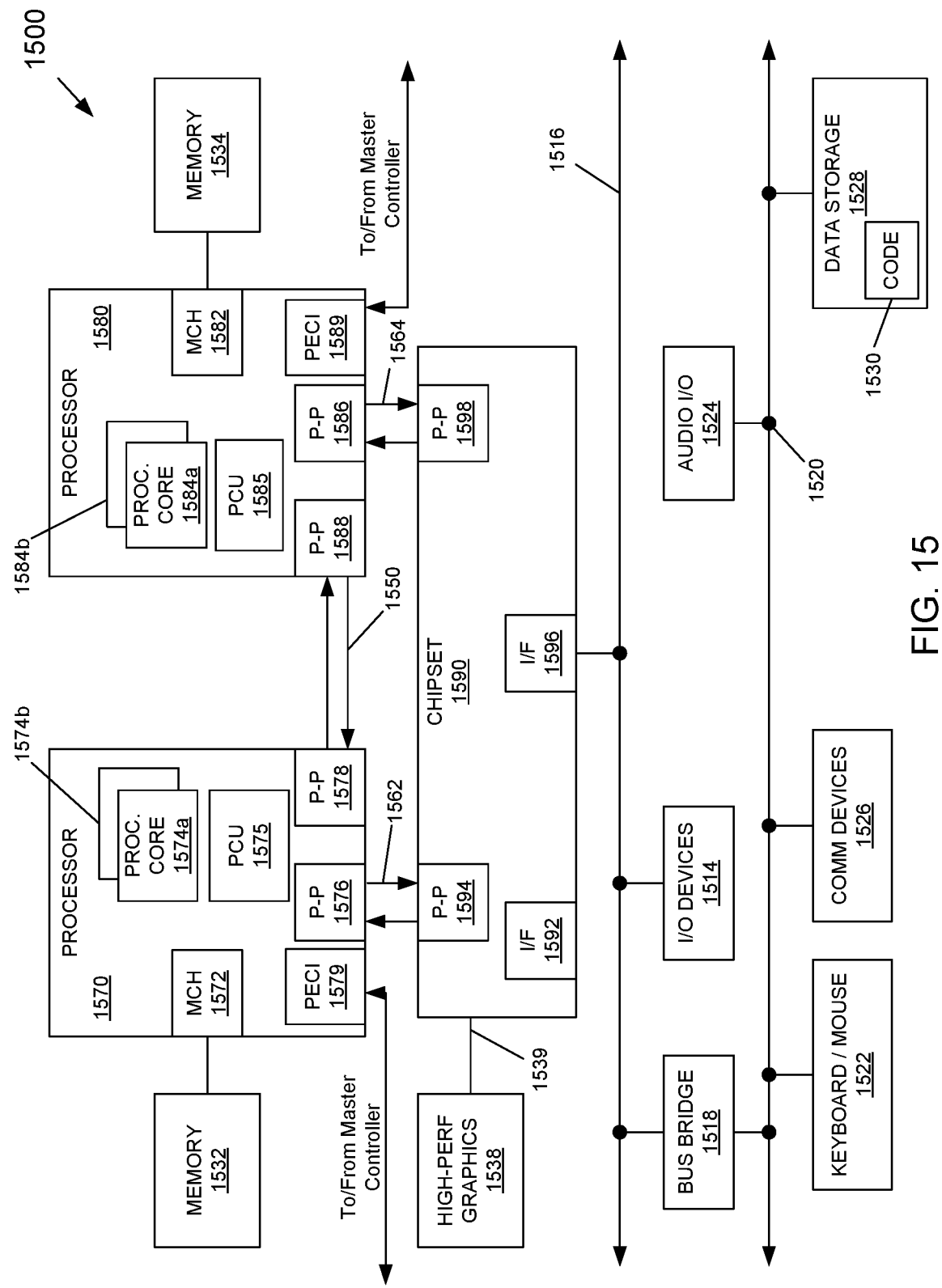
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processors 1574*a* and 1574*b* and processor cores 1584*a* and 1584*b*), although potentially many more cores may be present in the processors. Each of the processors can include a PCU 1575, 1585 to perform processor-based power management, including the PECI-based override of at least certain OS-provided hint information for HWP control of processor cores of the processors. To this end as further illustrated in FIG. 15, processors 1570, 1580 may include corresponding PECI interfaces 1579, 1589, each of which may provide a sideband-based mechanism to communicate with a processor external entity, such as a given management controller. In embodiments in which system 1500 is implemented as a server system such as a rack-based server system, this external management controller may be implemented as a baseboard management controller, although other implementations are possible.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chip set 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
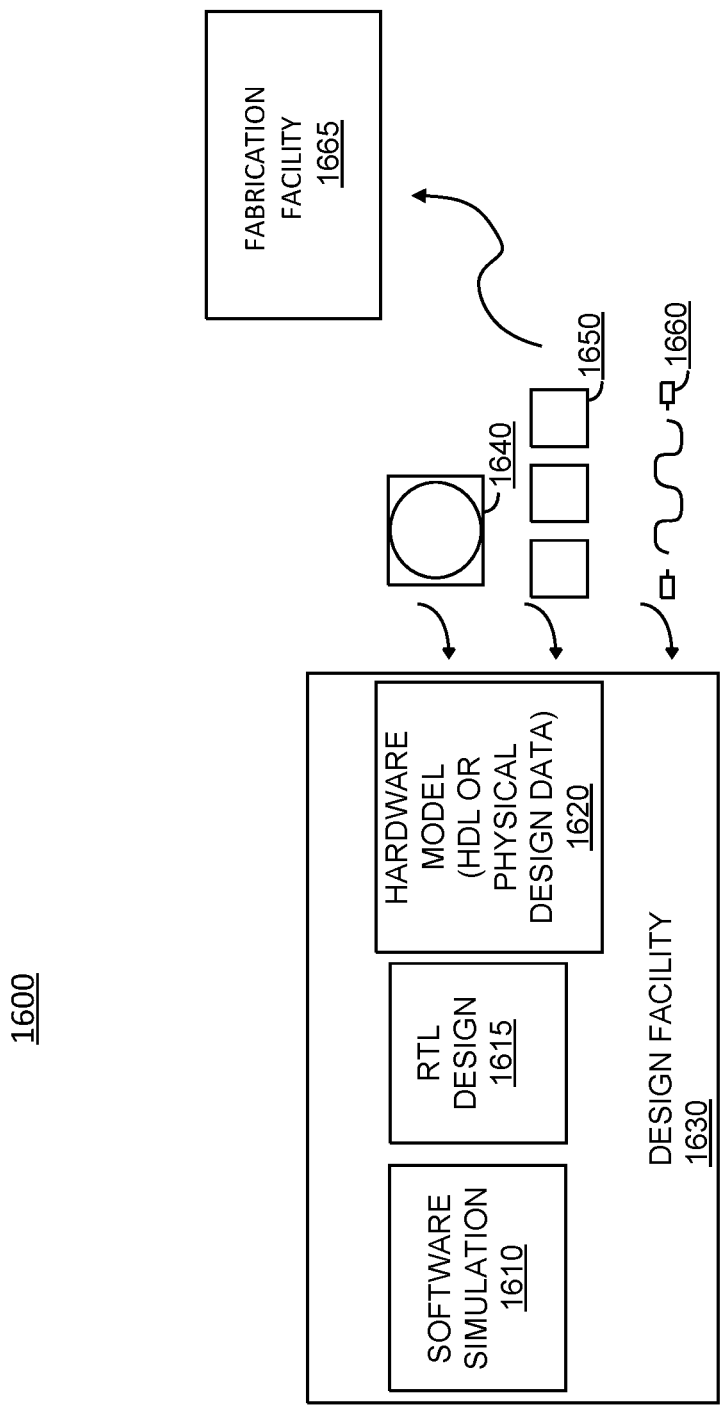
FIG. 16 is a block diagram illustrating an IP core development system used to manufacture an integrated circuit to perform operations according to an embodiment.

FIG. 16 is a block diagram illustrating an IP core development system 1600 that may be used to manufacture an integrated circuit to perform operations according to an embodiment. The IP core development system 1600 may be used to generate modular, re-usable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

Figure 17:
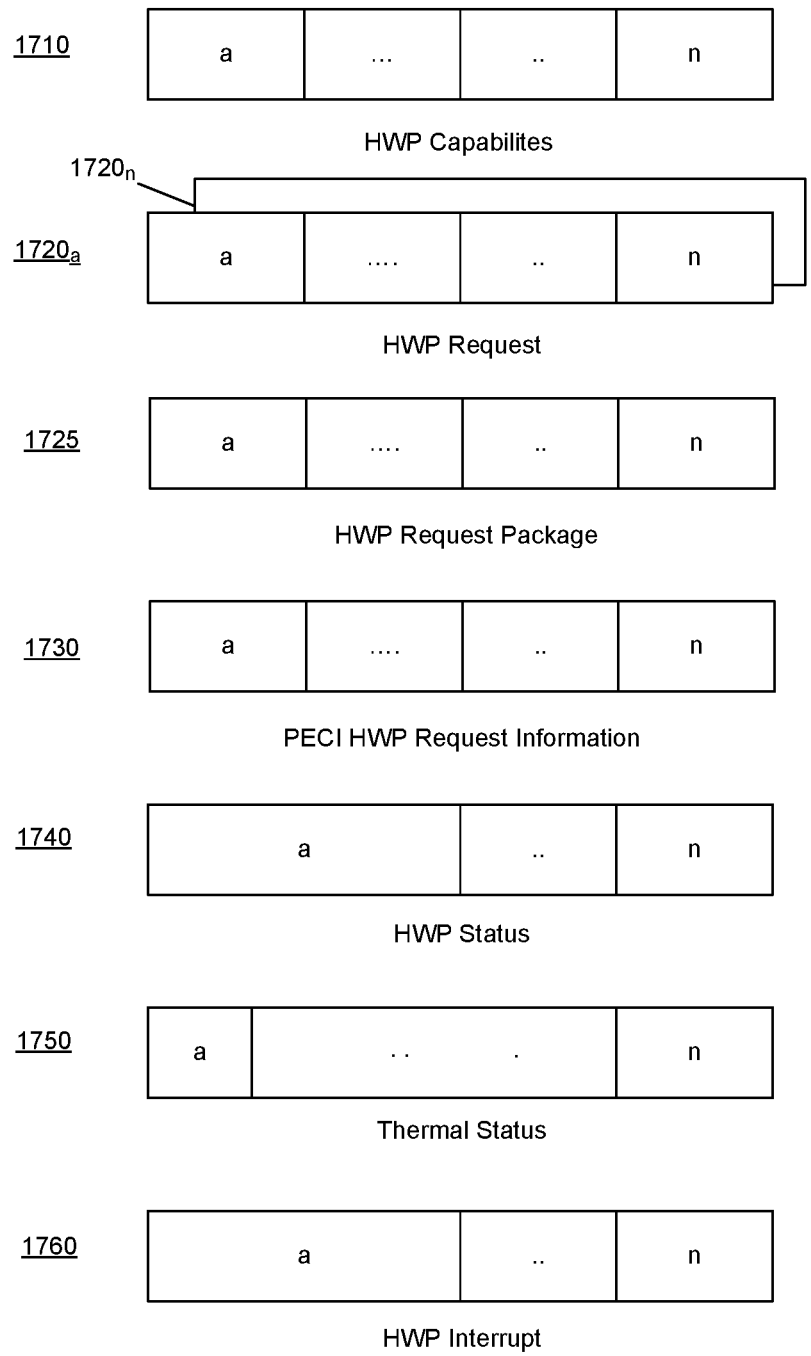
FIG. 17 is a block diagram of a register arrangement in accordance with an embodiment of the present invention.

As discussed above, in some embodiments a processor may provide a HWP interface to enable, among other features, the dynamic determination and communication of operating parameter information to effect performance state changes, including the capability to override OS-based hints with override information received from a processor-external entity as described herein. Referring now to FIG. 17, shown is a block diagram of a register arrangement in accordance with an embodiment of the present invention. Understand while shown with a limited set of registers for use in hardware performance state (HWP) control in the embodiment of FIG. 17, a processor may include many more or different MSRs in a particular configuration.

As seen, a capabilities register 1710 includes a plurality of fields a-n each of which may be configured to store a given capability of the processor. These fields may store information regarding various performance levels including, for example, lowest and highest performance levels, a guaranteed performance level and a most efficient performance level. Understand that these fields may be periodically updated by overwriting a current value with new values, as these performance levels may be updated during processor operation. Understand that while fields a-n are shown for ease of convention, given registers described herein may include more or fewer fields, and the terminology of fields extending from field a to field n is for illustrative purposes only. Note that capabilities register 1710 can be defined per logical processor (such that each logical processor has different capabilities).

With further reference to FIG. 17, a HWP request register 1720 includes fields a-n to store particular values in which various requests can be provided to a processor hardware mechanism, e.g., from an OS or other supervisor entity. In one embodiment, such fields may include fields configured to store minimum and maximum performance levels desired by an OS. Additional fields relate to other HWP operating parameters, including a desired performance level, an energy performance preference, and an activity window. Still further, a package control indicator may be provided, which when set indicates that the control inputs for this register are to be derived from a package-level register, details of which are described further below.

Note that in embodiments, a plurality of request registers $1720_a$-$1720_n$ may be provided, each of which is associated with a given hardware thread or logical processor. In this way, each logical processor may be associated with its own request register, such that fine-grained control of requests from each logical processor may be implemented. Understand that the fields a-n of request register 1720 may be used to convey hints to HWP hardware from the OS. These hints thus convey information from OS to the HWP hardware to influence decisions by the hardware. However, given the presence of possible constraints due to, e.g., thermal, power or other processor constraints, such requests or hints may not always be achieved. In an embodiment, request register 1720 may have fields as in Table 1, which are exemplary fields of a MSR in accordance with an embodiment of the present invention.

TABLE 1

| Field | Definition | Bits | Width |
|---|---|---|---|
| Minimum Performance | Conveys a minimum performance hint to achieve a requested quality of service (QoS) or to meet a service level agreement (SLA). Note that an excursion below the level specified is possible due to hardware constraints. | 7:0 | 8 |
| Maximum Performance | Conveys a hint to limit the maximum performance that is expected to be supplied by the HWP hardware. Excursions above the limit requested by OS are possible due to hardware coordination between processor cores and other components in a package. | 15:8 | 8 |
| Desired Performance | When set to zero, hardware autonomous selection determines the performance target. When set to a non-zero value, it is an explicit performance request hint to HWP hardware, effectively disabling hardware autonomous selection. | 23:16 | 8 |
| Energy Performance Preference | Conveys a hint to influence the rate of performance increase/decrease and the result of the hardware's energy efficiency and performance optimizations. | 31:24 | 8 |
| Activity Window | Conveys a hint specifying a moving workload history observation window for performance/frequency optimizations. If 0, the hardware will determine the appropriate window size, to influence the rate of performance increase/decrease. | 41:32 | 10 |
| Package Control | When set, causes this logical processor's HWP_REQUEST control inputs to be derived from a HWP_REQUEST_PKG register. | 42 | 1 |
| Activity Window Valid | When set, if the package control bit is set, takes active window value from this MSR | 59 | 1 |
| EPP Valid | When set, if the package control bit is set, takes EPP value from this MSR | 60 | 1 |
| Desired Valid | When set, if the package control bit is set, takes Desired Performance value from this MSR | 61 | 1 |
| Maximum Valid | When set, if the package control bit is set, takes Maximum Performance value from this MSR | 62 | 1 |
| Minimum Valid | When set, if the package control bit is set, takes Minimum Performance value from this MSR | 63 | 1 |

Still with reference to FIG. 17, another HWP request register 1725 may be included to provide an overall package-based set of fields. In an embodiment, fields a-n within package request register 1725 may apply to all logical processors within a package that have a corresponding package control field set within its associated request register 1720. These fields may have the same information as the fields of request register 1720 (with the exception of the package control field and the valid bits (bits 59-63), which are not part of the package-level MSR).

In order to provide PECI-based overriding of OS hints for hardware P-state control, embodiments may further include a PECI request register 1730. In embodiments, register 1730 may include a plurality of fields to store override information received from a platform agent such as a node manager, management controller, manageability engine or so forth. In addition to multiple fields for providing override (by PECI) information for various HWP settings, register 1730 may further include corresponding override indicators, each associated with one of the settings, such that when the override indicator is active or set, the override information of the corresponding field may be used to control HWP operation. Stated another way, when a given override indicator is set within register 1730, the HWP hint information present in the corresponding field of PECI request register 1730 is used for control of HWP operation, rather than the corresponding field in HWP request registers 1720 and/or request package register 1725. In an embodiment, PECI request register 1730 may include fields, as in Table 2.

TABLE 2

| Field | Definition | Bits | Width |
|---|---|---|---|
| Minimum Performance | Used by OS to read the latest value of PECI minimum performance input | 7:0 | 8 |
| Maximum Performance | Used by OS to read the latest value of PECI maximum performance input | 15:8 | 8 |
| Energy Performance Preference | Used by OS to read the latest value of PECI energy performance preference input | 31:24 | 8 |
| ... | ... | ... | ... |
| EPP PECI Override | Indicates whether PECI is currently overriding the energy performance preference input. If set (1), PECI is overriding the energy performance preference input. If clear (0), OS has control over energy performance preference input | 60:60 | 1 |
| Reserved | | 61:61 | 1 |
| Max PECI Override | Indicates whether PECI is currently overriding the maximum performance input. If set (1), PECI is overriding the maximum performance input. If clear (0), OS has control over maximum performance input | 62:62 | 1 |
| Min PECI Override | Indicates whether PECI is currently overriding the minimum performance input. If set (1), PECI is overriding the minimum performance input. If clear (0), OS has control over maximum performance input | 63:63 | 1 |

A status register 1740 may include a plurality of fields a-n each of which is configured to store feedback information regarding HWP operation. In an embodiment, one of these fields may be configured to store a guaranteed frequency change indicator, which may be set by processor hardware to indicate a change to a current guaranteed frequency. When this set indicator is read by an OS or other entity, reference may then be made to capabilities register 1710 to determine the updated guaranteed frequency value. Also the OS or other entity may reset the guaranteed frequency indicator upon reading the indicator. In addition, status register 1740 may further include fields to store information regarding PECI override entries and exits. More specifically, a PECI override enter field may be set when a management controller initiates a PECI override of one or more OS-based hints. In turn, a PECI override exit field may be set when the management controller exits a PECI override of one or more OS-based hints. In an embodiment, status register 1740 may include the fields as in Table 3.

TABLE 3

| Field | Definition | Bits | Widths |
|---|---|---|---|
| Guaranteed Change | If set (1), a change to guaranteed performance has occurred. Software can query the capabilities register to ascertain the new guaranteed performance value. Software clears this bit by writing a zero (0). | 0 | 1 |
| Excursion to Minimum | If set (1), an excursion to minimum performance has occurred. Software clears this bit by writing a zero (0). | 2 | 1 |
| Highest Change | If set (1), a change to highest performance has occurred. Software can query the capabilities register to ascertain the new highest performance value. Software clears this bit by writing a zero (0). | 3 | 1 |
| PECI override enter | If set (1), a management controller has started a PECI override of one or more OS control hints (e.g., min, max, EPP) specified in a request or request package register. Software clears this bit by writing a zero (0). | 4 | 1 |

TABLE 3-continued

| Field | Definition | Bits | Widths |
|---|---|---|---|
| PECI override exit | If set (1), a management controller has stopped a PECI override of all OS control hints (e.g., min, max, EPP) specified in a request or request package register. Software clears this bit by writing a zero (0). | 5 | 1 |

Still with reference to FIG. 17, MSRs 1700 may further include a thermal status register 1750 including a plurality of fields a-n. This register may be used to provide a variety of status information regarding thermal threshold crossings, logs, power limit settings and logs, current limit settings and logs, among other information. When a given constraint is exceeded, the information stored in one of the fields of thermal status register 1750 may be set. When this set field is read by a given OS or power management entity, various updates to operating parameters, including guaranteed frequency, may be initiated.

Finally, an interrupt register 1760 is provided including a plurality of fields a-n. In an embodiment, one or more of these fields is configured to store an interrupt indicator to indicate, when set, that an interrupt is to be generated and communicated, e.g., to the OS, when an update to a given field of capabilities register 1710 occurs. In embodiments herein, interrupt register 1760 may include a PECI override indicator which, when set, causes generation of an HWP interrupt when a management entity supersedes a given OS control hint stored in an HWP request or HWP request package register. In an embodiment, interrupt register 1760 may include the fields as in Table 4.

TABLE 4

| Field | Definition | Bits | Width |
|---|---|---|---|
| Change to Guaranteed | When set (1), an HWP interrupt will be generated whenever a change to the guaranteed performance occurs. Default = interrupt disabled (0). | 0 | 1 |
| Excursion to Minimum | When set (1), an HWP interrupt will be generated whenever hardware is unable to meet the minimum performance. Default = interrupt disabled (0). | 1 | 1 |
| Change to Highest | When set (1), an HWP interrupt will be generated whenever a change to the highest performance occurs. Default = interrupt disabled (0). | 2 | 1 |
| PECI Override | When set (1), an HWP interrupt will be generated whenever a management controller supersedes one or more of the OS control hints (e.g., min, max, EPP) specified in a request or request package register. | 3 | 1 |

Understand while shown with this limited set of registers, other or different registers are possible in an embodiment. Furthermore, understand while described in generality with each register including n fields, each register may be differently configured to include a given number of fields.

Figure 18:
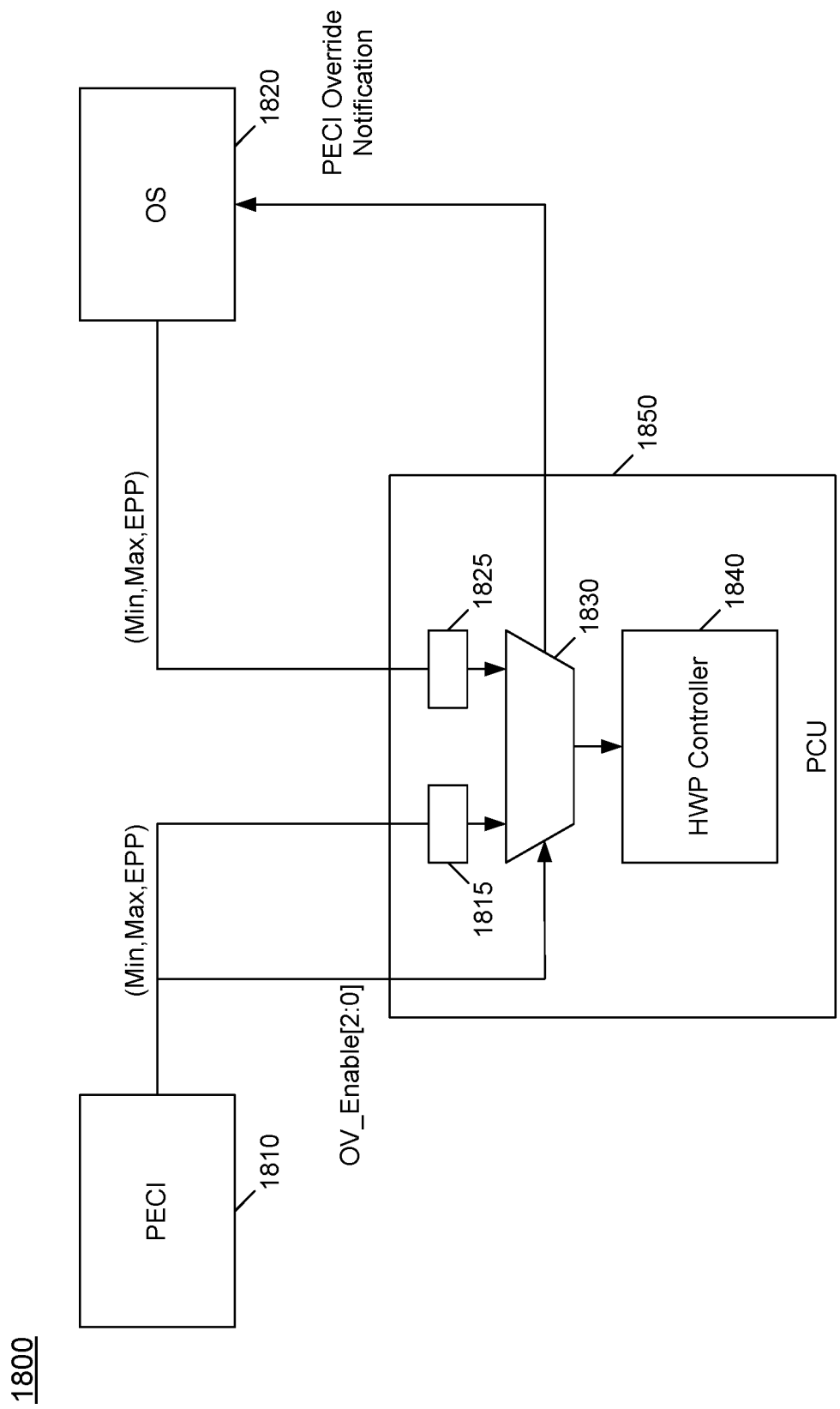
FIG. 18 is a block diagram portion of a processor in accordance with an embodiment of the present invention.

Referring now to FIG. 18, shown is a block diagram portion of a processor in accordance with an embodiment of the present invention. As shown in FIG. 18, the portion of processor 1800 includes a power control unit (PCU) 1850. PCU 1850 may be implemented in different embodiments as a hardware circuit, firmware, software and/or combinations thereof. In some cases, PCU 1850 may be implemented as one or more microcontrollers of a multicore processor. In yet other cases, PCU 1850 may be implemented within a core, either as a dedicated core or as programmable logic of the core.

In any event, as shown in FIG. 18, PCU 1850 receives incoming information from a PECI interface 1810 and an operating system (OS) 1820. In the embodiment shown in FIG. 18, this information may include HWP override information from PECI interface 1810, including a minimum performance state value, a maximum performance state value and an energy performance preference (EPP). In addition to these HWP settings, PECI interface 1810 may further provide corresponding enable information (OV_Enable [0-2]) which, in an embodiment may be implemented as multiple override indicators each associated with one of the above HWP values. As seen, this information received via PECI interface 1810 may be stored in a storage 1815. In an embodiment, storage 1815 may be implemented as an MSR, such as a PECI HWP request register as discussed above. Note that in embodiments the enable information may additionally be directed to a selection circuit 1830. In an embodiment, selection circuit 1830 may be implemented as a multiplexer. Similarly, HWP settings also may be received from OS 1820 and stored in another storage 1825. In an embodiment, storage 1825 may be implemented as one or more other MSRs such as HWP request registers (e.g., one per logical processor) and/or a package level HWP register.

In turn, the information from registers 1815, 1825 may be provided to selection circuit 1830. Based upon the override enable information from PECI interface 1810, selection circuit 1830 is controlled to provide corresponding HWP values (namely minimum and maximum performance states and an EPP value) from either of the two sources. More specifically, if a given override indicator is set, the corresponding override HWP setting from register 1815 is output from selection circuit 1830. And if a corresponding override indicator is not set, the given HWP setting from register 1825 is output from selection circuit 1830. Note that in the instance of an override that occurs, selection circuit 1830 may output a PECI override notification to OS 1820. In an embodiment, this notification may be implemented by triggering the processor via the HWP notification mechanism, which may be supported as part of a thermal interrupt in a local APIC timer. In addition to the notification, hardware may set relevant bits in the HWP status MSR and in the PECI request MSR. Note that the override can be done for a subset of the control fields (e.g., one or more of MAX, MIN and EPP). The OS can learn which fields are overridden by access to the PECI request MSR. In an embodiment, the notification may be done one time when PECI takes control for one or more fields, and another time when the PECI releases control for the one or more fields. Note also where the OS enable notifications for this event, an interrupt is generated to the OS to provide indication of the override. In an embodiment, this notification is supported as other HWP notification flows. For example, a local APIC thermal interface may be used. Following PECI override notification, a status bit is set. In order to enable notification, software may enable the PECI notification in a HWP interrupt register. Following the interrupt, the OS may clear a status bit in a thermal status register in order to allow a PECI interrupt to again occur.

Still with reference to FIG. 18, note that the HWP values output by selection circuit 1830 may be provided to an HWP controller 1840 within PCU 1850. In embodiments, HWP controller 1840 may be implemented as hardware circuitry, firmware, software and/or combinations thereof. HWP controller 1840 may perform hardware-based performance state control of one or more logical processors based at least in part on the received HWP settings. Understand while shown at this high level in the embodiment of FIG. 18, the scope of the present invention is not limited in this regard and other implementations are possible. For example, while FIG. 18 is with regard to PECI-based potential overriding of three HWP values, in other cases, additional or different HWP values may be overridden. Furthermore, while embodiments described herein are with regard to PECI-based override of HWP parameters, in other cases PECI-based override information may be received for other types of power control and other operating parameters for a processor. For example in other cases, PECI-based override information may be received for operating parameters such as a legacy P-state energy performance bias hint or other parameters.

Figure 19:
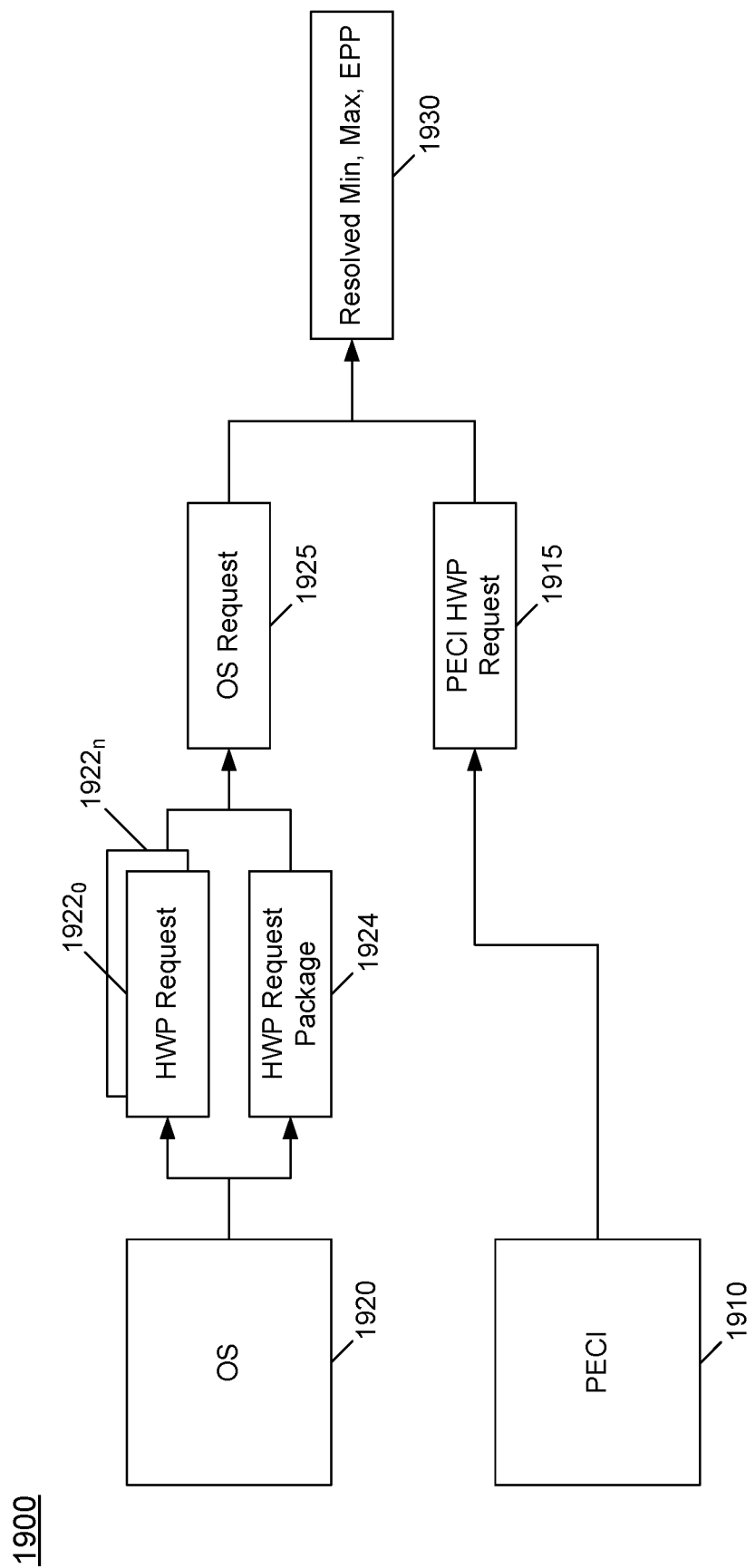
FIG. 19 is a block diagram of a logical view of controllable sourcing of configuration values from multiple sources in accordance with an embodiment of the present invention.

Referring now to FIG. 19, shown is a block diagram of a logical view of controllable sourcing of configuration values from multiple sources in accordance with an embodiment of the present invention. As illustrated in FIG. 19, a processor 1900 may receive HWP information from multiple sources. Specifically, such information may be received via a PECI interface 1910 and an OS 1920. More specifically, via PECI interface 1910, override information from a management controller may be stored in a PECI HWP request register 1915. As discussed above, in embodiments such override information may include a minimum P-state, maximum P-state and an EPP value, along with corresponding override indicators for each of these values. In turn, OS 1920 may provide various HWP configuration information, which may be provided on a per logical processor basis via HWP request registers $1922_0$-$1922_n$, and on a package-wide basis via HWP request package register 1924. In turn, on a logical processor basis, each of the HWP settings may be resolved to be directed from either the per thread information or from the package source to thus provide a resolved OS HWP request setting in an OS request storage 1925. In turn, based at least in part on the override information stored in PECI HWP request register 1915, resolved HWP settings may be provided to another storage 1930. More specifically, storage 1930, which may be implemented as a resolved HWP register, may be used to store resolved settings based on OS-sourced settings and/or PECI-based settings. In this way, a given system may comply with OS requirements, yet allow for management controller-based overriding of one or more HWP settings in a native OS mode. Understand while shown with this particular realization in FIG. 19, the scope of the present invention is not limited in this regard and other embodiments are possible.

Figure 20:
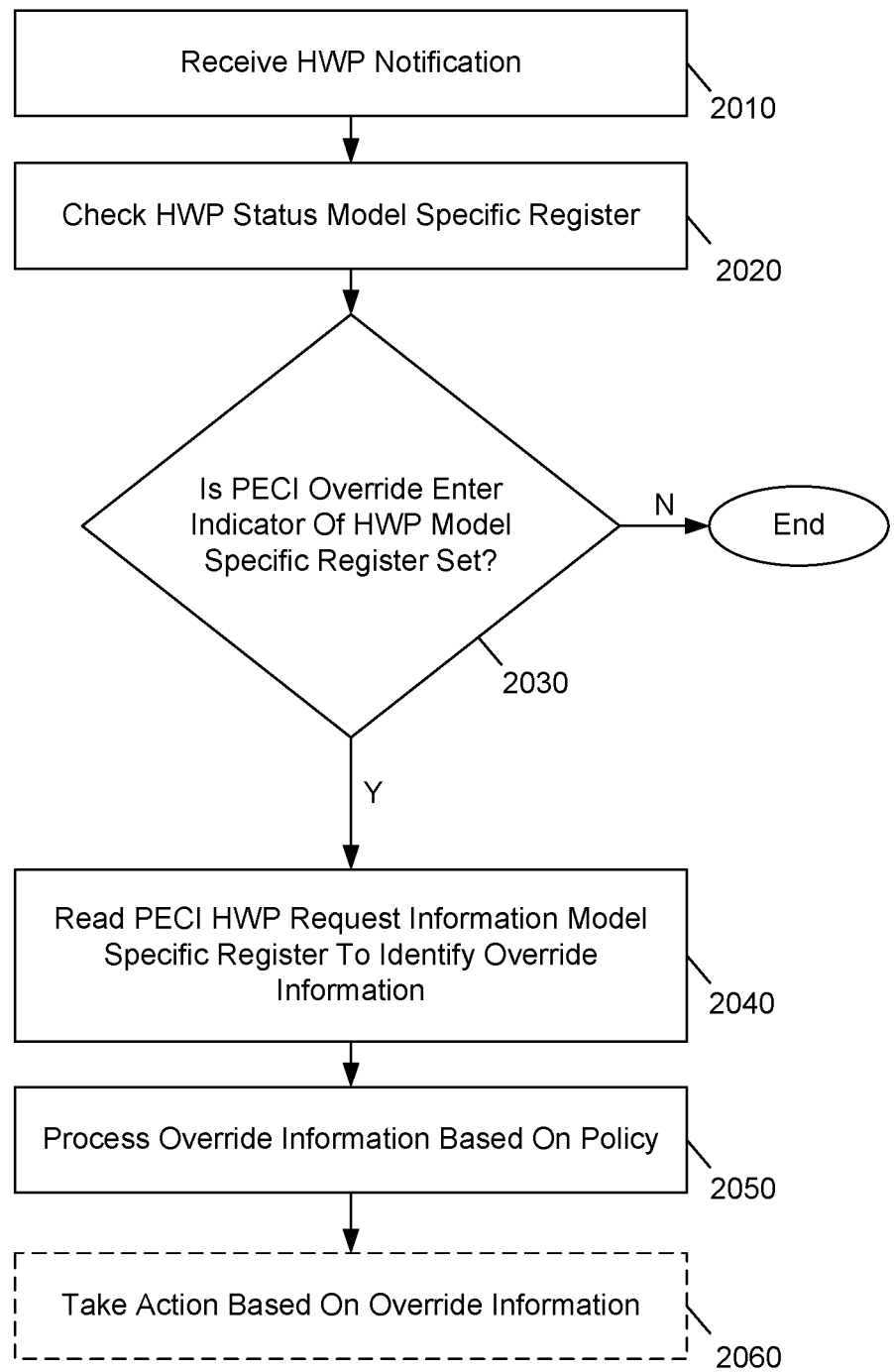
FIG. 20 is a flow diagram of a method in accordance with an embodiment of the present invention.

Referring now to FIG. 20, shown is a flow diagram of a method in accordance with an embodiment of the present invention. More specifically, method 2000 is a method for handling PECI-based overriding of one or more OS-based settings for HWP control. As such, method 2000 may be implemented at least in part via an OS that executes on one or more hardware cores or other hardware circuitry of a processor as described herein.

As illustrated, method 2000 begins by receiving an HWP notification within the OS (block 2010). In an embodiment, this notification may relate to a PECI-based override and can be implemented by way of a write to a PECI override field of an HWP interrupt register. Such notification is thus an indication to the OS that a management controller is to override or supersede one or more OS-based hints or settings used in HWP operation. Control next passes to block 2020 where, in response to this HWP notification, an HWP status MSR may be read. In an embodiment, this status register may include fields to indicate PECI override entry and exit. In this instance of initiation of a PECI override, a PECI override enter indicator may be set, e.g., by the PCU. Still with reference to FIG. 20, control next passes to diamond 2030 to determine whether this PECI override enter indicator is set. If so, control passes to block 2040 where the particular OS-based HWP hint(s) that are to be overridden may be read. The OS identifies which fields are now overridden based on the status of the override bits in the PECI HWP request information registers. In case that one of these bits is set, the OS can assume that its field is overridden by the PECI-provided information. As illustrated, this information may be obtained from the PECI HWP request information register. In an embodiment, the OS may identify one or more HWP hints that are to be overridden based on override indicators within this register, and read their corresponding override values. Thereafter, control passes to block 2050 where the OS may process the override information based on a given policy. For example, the OS may simply log information regarding this PECI override in a log file or align its quality of service (QoS) level based on the current performance available setting. As an example, the information to be logged may include a time of the override, the override values, duration of the override and so forth. As further illustrated, the OS may optionally take an action based on the override information, such as re-aligning a QoS level or so forth. Understand while shown at this high level in the embodiment of FIG. 20, many variations and alternatives are possible.

Figure 21:
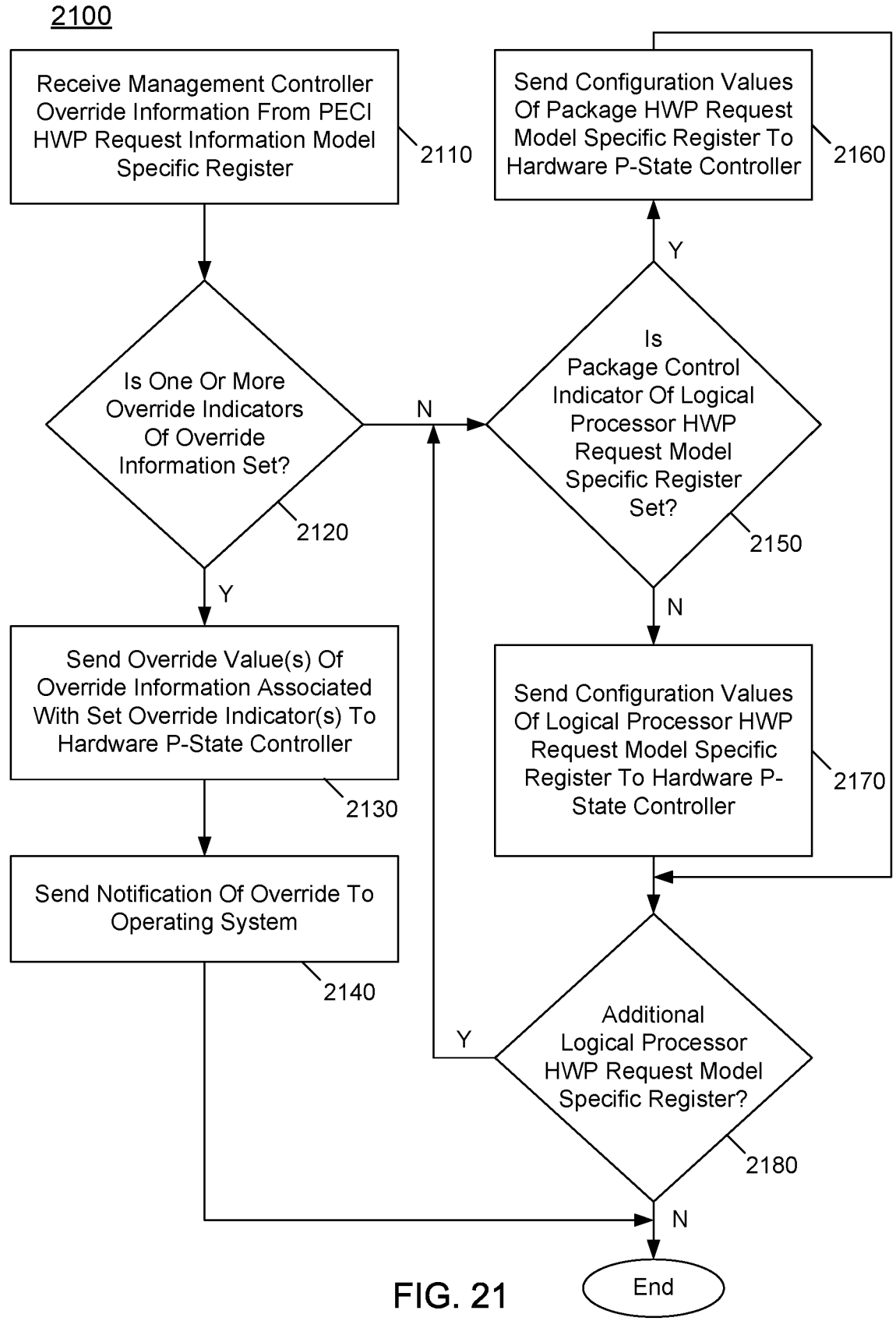
FIG. 21 is a block diagram of a method in accordance with another embodiment of the present invention.

Referring now to FIG. 21, shown is a flow diagram of a method in accordance with another embodiment of the present invention. More specifically, method 2100 shows PECI-based override update operation from the point of view of a power controller. As such, method 2100 may be performed by hardware circuitry, firmware, software and/or combinations thereof.

As illustrated, method 2100 begins by receiving management controller override information from a PECI HWP request information MSR (block 2110). This information may be received within the power controller and can be provided, e.g., as an input to a selection circuit. Next it is determined whether one or more override indicators of this override information are set (diamond 2120). If so, the override value of the override information associated with a set override indicator may be sent to an HWP controller (block 2130). For example, assume that the override indicator is active only for a minimum performance state hint. In this case, the value of the minimum performance state setting received via the PECI interface may be provided to the HWP controller. In turn, remaining HWP fields may be obtained from an OS-based request register. Control next passes to block 2140 where a notification of override may be sent to the operating system. As discussed above in an embodiment this notification may be by way of setting of an override field within an interrupt register, accessible to the OS.

Still with reference to FIG. 21, instead if it is determined at diamond 2120 that no override indicators are set, control passes to block 2150 to determine whether, for a given logical processor HWP request register, a package control indicator is set. If so, configuration values of a package HWP request register may be sent to the HWP controller for this logical processor (block 2160). Otherwise if this package control indicator is not set for a given logical processor HWP request register, control passes to block 2170 where configuration values of that logical processor HWP request register are sent to the HWP controller. Control next passes to diamond 2180 to determine whether there are additional logical processor HWP request registers to be accessed. If so, control passes back to diamond 2150 discussed above. Otherwise method 2100 concludes. Understand while shown at this high level in the embodiment of FIG. 21, many variations and alternatives are possible. In an embodiment, if the package control bit is set in the thread level request MSR, hardware may select fields of, minimal performance, maximal performance desired performance, EPP or activity window, based on the valid bits in this MSR.

Figure 22:
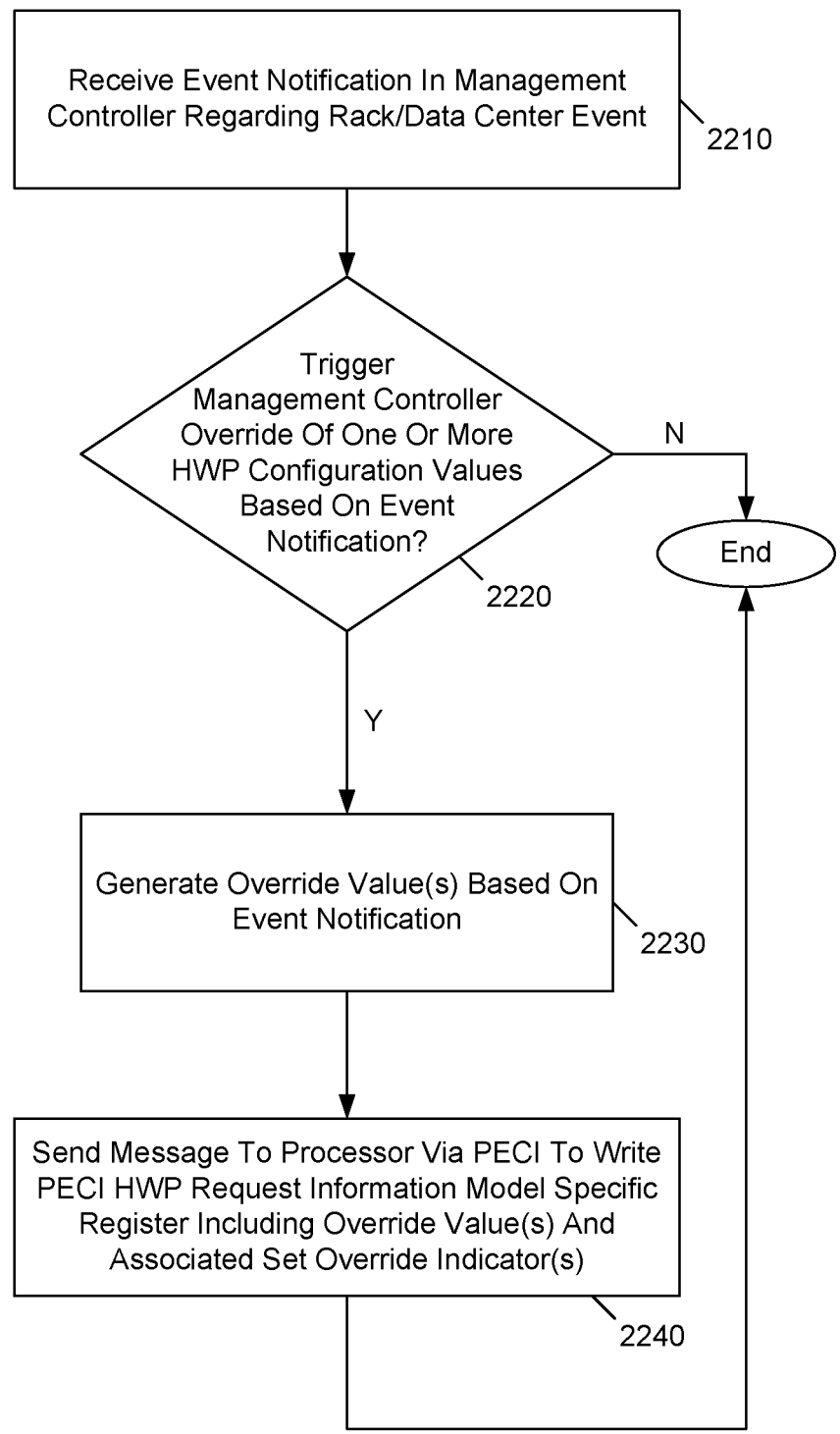
FIG. 22 is a flow diagram of a method in accordance with yet another embodiment of the present invention.

Referring now to FIG. 22, shown is a flow diagram of a method in accordance with yet another embodiment of the present invention. As illustrated in FIG. 22, method 2200 is a method for providing HWP override information from a management controller via a PECI interface as described herein. As illustrated in FIG. 22, method 2200 may be performed by a management controller. In different embodiments, the management controller may be implemented as a separate component of a platform such as a server platform. In such cases, a server-based controller may provide this information. In a data center implementation, such controller may be a baseboard management controller or another controller that operates, e.g., for a rack of servers. In still further embodiments, higher levels of granularity may provide such control, such as a management controller that operates on multiple racks of a data center.

In any event, method 2200 begins by receiving an event notification in the management controller (block 2210). More specifically, this notification may be a notification of a given rack/data center event. For example, the event may correspond to a thermal event such as a thermal threshold crossing, a data center QoS violation, a workload-related event such as a change in data center performance demand or so forth, a power limitation activity levels (and/or priorities), or other interrupt supported by an interrupt register. Next, control passes to diamond 2220 to trigger the management controller override of one or more HWP configuration values based on this event notification. Note that the management controller may operate according to particular policies in determining, based on the event notification, whether override of HWP parameters is to occur. If the determination, e.g., based upon the policy is that no override is to occur, no further operations occur and method 2200 concludes.

Instead if it is determined based upon the event notification that override is to occur, control passes next to block 2230 where one or more override values may be generated based on the event notification. For example, in the context of a thermal event, an override value for a maximum P-state may be set that lowers the maximum performance state to a lower level (e.g., a guaranteed performance level) to seek reduction of the thermal event. In other cases, such as where the event notification is of an increased workload, a minimum P-state setting may be updated to a higher level. For a data center node with low priority tasks (e.g., background logging), EPP can be overridden to indicate a preference for energy efficiency. Next, control passes to block 2240 where the management controller sends a message to the processor. As an example, the management controller sends this message via a PECI interface. In an embodiment, the message may include a write request to the PECI HWP request register. More specifically this write request may include the override values and associated override indicators to write the information to the register so that it may be read by the PCU and used in HWP operation. Understand while shown at this high level in the embodiment of FIG. 22, many variations and alternatives are possible. Embodiments thus enable PECI-based override of native control of one or more HWP control parameters/hints concurrently while HWP or other OS native P-state control is in use.

The following examples pertain to further embodiments.

In one example, a processor comprises: one or more cores to execute instructions; a first request register to store hardware performance state control information for a first core of the one or more cores, the hardware performance state control information obtained from an operating system; a second request register to store hardware performance state control override information, the hardware performance state control override information to be received from a management controller coupled to the processor; and a power controller coupled to the one or more cores to control a performance state of the first core based at least in part on the hardware performance state override information when at least one override indicator of the second request register is set.

In an example, the processor further comprises a platform environment control interface to receive the hardware performance state control override information from the management controller, the platform environment control interface to write the hardware performance state control override information to the second request register.

In an example, the second request register comprises a platform environment control interface hardware performance state control register.

In an example, the processor further comprises an interrupt register including a plurality of interrupt indicators, including a first interrupt indicator to indicate that override of at least some of the hardware performance state control information stored in the first request register is to occur.

In an example, the power controller is to autonomously cause a change in a performance state of the first core based at least in part on at least one override value of the hardware performance state control override information and at least one value of the hardware performance state control information.

In an example, the processor further comprises a status register including: a first field to store a first override indicator to indicate that the management controller has initiated an override of at least a portion of the hardware performance state control information; and a second field to store a second override indicator to indicate that the management controller has terminated the override of at least the portion of the hardware performance state control information.

In an example, the processor further comprises a selection circuit to receive the hardware performance state control information from the first request register and the hardware performance state control override information from the second request register and to control provision of at least some of the hardware performance state control override information to the power controller in response to one or more override indicators of the hardware performance state control override information.

In an example, the selection circuit is to notify the operating system regarding the override of at least some of the hardware performance state control information.

In another example, a method comprises: receiving, in a selection circuit of a processor, override information from a management controller of a platform including the processor, the override information including one or more override values and one or more override indicators, the override information associated with hardware performance state control of the processor; determining whether at least one of the one or more override indicators is active; in response to determining that the at least one of the one or more override indicators is active, sending at least one of the one or more override values associated with the active at least one of the one or more override indicators to a power controller of the processor; and controlling, by the power controller, a performance state of at least one of a plurality of cores of the processor based at least in part on the at least one of the one or more override values.

In an example, the method further comprises in response to determining that the at least one of the one or more override indicators is active, notifying an operating system of an override of one or more hardware performance state control values provided by the operating system.

In an example, notifying the operating system comprises setting an interrupt indicator in an interrupt register of the processor.

In an example, the method further comprises controlling the performance state to be a minimum performance state having a first level based at least in part on the at least one of the one or more override values.

In an example, the method further comprises receiving the override information via a platform environment control interface of the processor, and sending the at least one of the one or more override values comprises sending a first override value for a first hardware performance state control parameter, and overriding a logical processor hardware performance state value and a package hardware state performance value for the first hardware performance state control parameter.

In an example, the method further comprises: setting a first indicator of a status register of the processor to enumerate an override by the management controller of one or more operating system-provided hardware performance state control parameters; and setting a second indicator of the status register to enumerate a termination of the override by the management controller of the one or more operating system-provided hardware performance state control parameters.

In an example, the method further comprises controlling the performance state based at least in part on a combination of the at least one of the one or more override values and at least one hardware performance state control value received from an operating system.

In an example, the method further comprises controlling the performance state based at least in part on the combination of the at least one of the one or more override values and the at least one hardware performance state control value received from the operating system during a native mode of the hardware performance state control.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system includes a processor comprising a first core to execute instructions, a first request register to store hardware performance state control information for the first core to be received from an operating system, a second request register to store hardware performance state control override information to be received from a management controller, and a power controller coupled to the first core to control a performance state of the first core based on a combination of at least some of the hardware performance state control information and at least some of the hardware performance state control override information. The system may further include the management controller coupled to the processor, the management controller to receive environmental information associated with one or more components of the system external to the processor and generate the hardware performance state control override information based at least in part on the environmental information.

In an example, the management controller comprises a baseboard management controller to generate the hardware performance state control override information further in response to an event notification comprising the environmental information, the event notification to indicate that a temperature of at least one of the one or more components exceeds a threshold.

In an example, the management controller is to send a write message to the processor, the write message including the hardware performance state control override information and one or more set override indicators.

In an example, the processor further comprises a platform environment control interface to receive the hardware performance state control override information from the management controller, the platform environment control interface to write the hardware performance state control override information to the second request register.

In a still further example, an apparatus comprises: means for receiving override information from a management controller of a platform including a processor, the override information including one or more override values and one or more override indicators, the override information associated with hardware performance state control of the processor; means for sending at least one of the one or more override values associated with the active at least one of the one or more override indicators to a power control means; and the power control means for controlling a performance state of at least one of a plurality of cores of the processor based at least in part on the at least one of the one or more override values.

In an example, the apparatus further comprises means for notifying an operating system of an override of one or more hardware performance state control values provided by the operating system.

In an example, the power control means is to control the performance state to be a minimum performance state having a first level based at least in part on the at least one of the one or more override values.

In an example, the processor further comprises platform environment control interface means for receiving the override information.

In an example, the apparatus further comprises: means for setting a first indicator of status register means to enumerate an override by the management controller of one or more operating system-provided hardware performance state control parameters; and means for setting a second indicator of the status register means to enumerate a termination of the override by the management controller of the one or more operating system-provided hardware performance state control parameters.

In an example, the power control means is to control the performance state based at least in part on a combination of the at least one of the one or more override values and at least one hardware performance state control value received from an operating system.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   one or more cores to execute instructions;
   a first request register to store hardware performance state control information for a first core of the one or more cores, the hardware performance state control information obtained from an operating system;
   a second request register to store hardware performance state control override information, the hardware performance state control override information to be received from a management controller coupled to the processor; and
   a power controller coupled to the one or more cores to control a performance state of the first core based at least in part on the hardware performance state control override information when at least one override indicator of the second request register is set.

2. The processor of claim 1, further comprising a platform environment control interface to receive the hardware performance state control override information from the management controller, the platform environment control interface to write the hardware performance state control override information to the second request register.

3. The processor of claim 2, wherein the second request register comprises a platform environment control interface hardware performance state control register.

4. The processor of claim 1, further comprising an interrupt register including a plurality of interrupt indicators, including a first interrupt indicator to indicate that override of at least some of the hardware performance state control information stored in the first request register is to occur.

5. The processor of claim 1, wherein the power controller is to autonomously cause a change in a performance state of the first core based at least in part on at least one override value of the hardware performance state control override information and at least one value of the hardware performance state control information.

6. The processor of claim 1, further comprising a status register including:
   a first field to store a first override indicator to indicate that the management controller has initiated an override of at least a portion of the hardware performance state control information; and
   a second field to store a second override indicator to indicate that the management controller has terminated the override of at least the portion of the hardware performance state control information.

7. The processor of claim 1, further comprising a selection circuit to receive the hardware performance state control information from the first request register and the hardware performance state control override information from the second request register and to control provision of at least some of the hardware performance state control override information to the power controller in response to one or more override indicators of the hardware performance state control override information.

8. The processor of claim 7, wherein the selection circuit is to notify the operating system regarding the override of at least some of the hardware performance state control information.

9. A non-transitory machine-readable medium having stored thereon instructions, which if performed by a machine cause the machine to perform a method comprising:
   receiving, in a selection circuit of a processor, override information from a management controller of a platform including the processor, the override information including one or more override values and one or more override indicators, the override information associated with hardware performance state control of the processor;
   determining whether at least one of the one or more override indicators is active;
   in response to determining that the at least one of the one or more override indicators is active, sending at least one of the one or more override values associated with the active at least one of the one or more override indicators to a power controller of the processor; and
   controlling, by the power controller, a performance state of at least one of a plurality of cores of the processor based at least in part on the at least one of the one or more override values.

10. The non-transitory machine-readable medium of claim 9, wherein the method further comprises in response to determining that the at least one of the one or more override indicators is active, notifying an operating system of an override of one or more hardware performance state control values provided by the operating system.

11. The non-transitory machine-readable medium of claim 10, wherein notifying the operating system comprises setting an interrupt indicator in an interrupt register of the processor.

12. The non-transitory machine-readable medium of claim 9, wherein the method further comprises controlling the performance state to be a minimum performance state having a first level based at least in part on the at least one of the one or more override values.

13. The non-transitory machine-readable medium of claim 9, wherein the method further comprises receiving the override information via a platform environment control interface of the processor, and wherein sending the at least one of the one or more override values comprises sending a first override value for a first hardware performance state control parameter, and overriding a logical processor hardware performance state value and a package hardware state performance value for the first hardware performance state control parameter.

14. The non-transitory machine-readable medium of claim 9, wherein the method further comprises:
   setting a first indicator of a status register of the processor to enumerate an override by the management controller of one or more operating system-provided hardware performance state control parameters; and
   setting a second indicator of the status register to enumerate a termination of the override by the management controller of the one or more operating system-provided hardware performance state control parameters.

15. The non-transitory machine-readable medium of claim 9, wherein the method further comprises controlling the performance state based at least in part on a combination of the at least one of the one or more override values and at least one hardware performance state control value received from an operating system.

16. The non-transitory machine-readable medium of claim 15, wherein the method further comprises controlling the performance state based at least in part on the combination of the at least one of the one or more override values and the at least one hardware performance state control value received from the operating system during a native mode of the hardware performance state control.

17. A system comprising:
   a processor comprising a first core to execute instructions, a first request register to store hardware performance state control information for the first core to be received from an operating system, a second request register to store hardware performance state control override information to be received from a management controller, and a power controller coupled to the first core to control a performance state of the first core based on a combination of at least some of the hardware performance state control information and at least some of the hardware performance state control override information; and
   the management controller coupled to the processor, the management controller to receive environmental information associated with one or more components of the system external to the processor and generate the hardware performance state control override information based at least in part on the environmental information.

18. The system of claim 17, wherein the management controller comprises a baseboard management controller to generate the hardware performance state control override information further in response to an event notification comprising the environmental information, the event notification to indicate that a temperature of at least one of the one or more components exceeds a threshold.

19. The system of claim 17, wherein the management controller is to send a write message to the processor, the write message including the hardware performance state control override information and one or more set override indicators.

20. The system of claim 17, wherein the processor further comprises a platform environment control interface to receive the hardware performance state control override information from the management controller, the platform environment control interface to write the hardware performance state control override information to the second request register.

* * * * *